US009213922B2

(12) United States Patent
Tanaka

(10) Patent No.: US 9,213,922 B2
(45) Date of Patent: Dec. 15, 2015

(54) INFORMATION PROCESSING APPARATUS, STORAGE MEDIUM STORED WITH INFORMATION PROCESSING PROGRAM, AND INFORMATION PROCESSING METHOD

(75) Inventor: Tsutomu Tanaka, Nagoya (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 179 days.

(21) Appl. No.: 13/614,658

(22) Filed: Sep. 13, 2012

(65) Prior Publication Data
US 2013/0083362 A1 Apr. 4, 2013

(30) Foreign Application Priority Data

Sep. 29, 2011 (JP) ................................. 2011-214142
Apr. 26, 2012 (JP) ................................. 2012-100731

(51) Int. Cl.
*G06K 15/02* (2006.01)
*H04N 1/00* (2006.01)
*H04N 1/32* (2006.01)

(52) U.S. Cl.
CPC ............ *G06K 15/02* (2013.01); *H04N 1/00244* (2013.01); *H04N 1/32128* (2013.01); *H04N 1/32149* (2013.01); *H04N 2201/0094* (2013.01); *H04N 2201/3254* (2013.01); *H04N 2201/3274* (2013.01)

(58) Field of Classification Search
None
See application file for complete search history.

(56) References Cited

U.S. PATENT DOCUMENTS

| | | | | |
|---|---|---|---|---|
| 5,892,587 A * | 4/1999 | Okada et al. | ................... | 358/402 |
| 6,108,459 A * | 8/2000 | Tsuji et al. | ..................... | 382/300 |
| 6,389,170 B1 * | 5/2002 | Kawasaki et al. | ............. | 382/232 |
| 6,585,777 B1 * | 7/2003 | Ramaley et al. | .............. | 715/205 |
| 6,704,119 B1 * | 3/2004 | Suzuki et al. | ................ | 358/1.16 |
| 6,903,833 B1 * | 6/2005 | Murata et al. | ................ | 358/1.15 |
| 7,028,032 B1 * | 4/2006 | Diedrich et al. | ..................... | 1/1 |
| 7,079,696 B2 * | 7/2006 | Koide | ........................... | 382/240 |
| 7,359,891 B2 * | 4/2008 | Nishino et al. | ......................... | 1/1 |
| 7,647,297 B2 * | 1/2010 | LaChapelle et al. | ... | 707/999.002 |
| 7,653,612 B1 * | 1/2010 | Veeraswamy et al. | . | 707/999.001 |
| 7,684,071 B2 * | 3/2010 | Moriwaki | ..................... | 358/1.15 |
| 7,685,229 B1 * | 3/2010 | George et al. | ................. | 709/203 |
| 7,898,680 B2 * | 3/2011 | Misawa et al. | ................ | 358/1.15 |
| 7,975,171 B2 * | 7/2011 | Haustein et al. | ............... | 714/5.1 |
| 2005/0240901 A1 * | 10/2005 | McKnight | ..................... | 717/110 |
| 2005/0254072 A1 * | 11/2005 | Hirai et al. | ..................... | 358/1.2 |
| 2007/0127085 A1 * | 6/2007 | Mori | ............................. | 358/403 |
| 2008/0313744 A1 * | 12/2008 | Nakajima et al. | ............... | 726/28 |

FOREIGN PATENT DOCUMENTS

JP 2006-203317 8/2006

* cited by examiner

*Primary Examiner* — Ashish K Thomas
(74) *Attorney, Agent, or Firm* — Frommer Lawrence & Haug LLP

(57) ABSTRACT

An information processing apparatus comprises a first acquiring controller which acquires a first file; a second acquiring controller which acquires area information to indicate a storage area on a predetermined storage medium, the first file acquired by the first acquiring controller being stored in the storage area; a generating controller which generates a second file having an additional information area capable of storing additional information, from the first file acquired by the first acquiring controller; and a storing controller which stores the area information acquired by the second acquiring controller as the additional information in the additional information area of the second file generated by the generating controller.

20 Claims, 15 Drawing Sheets

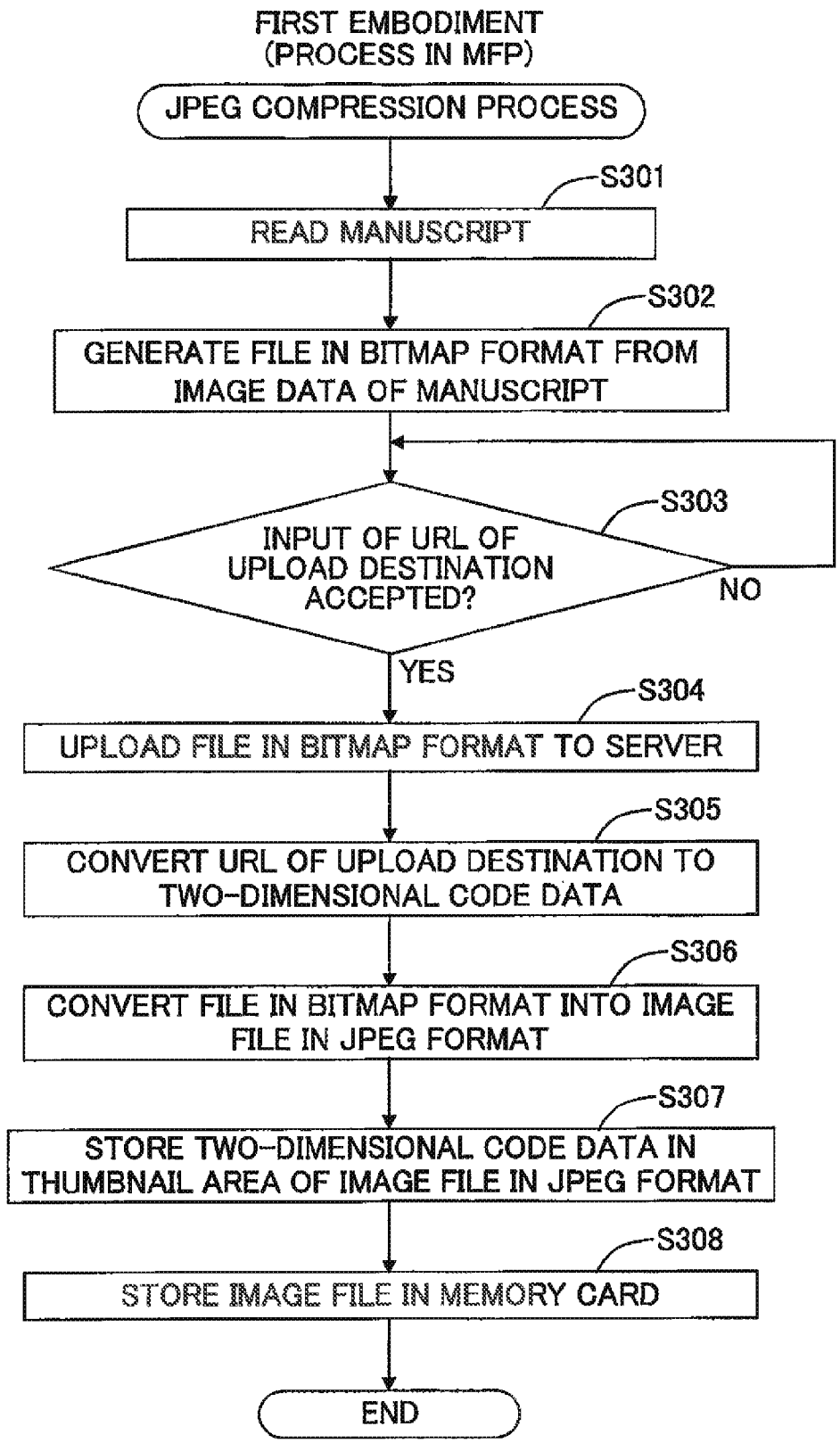

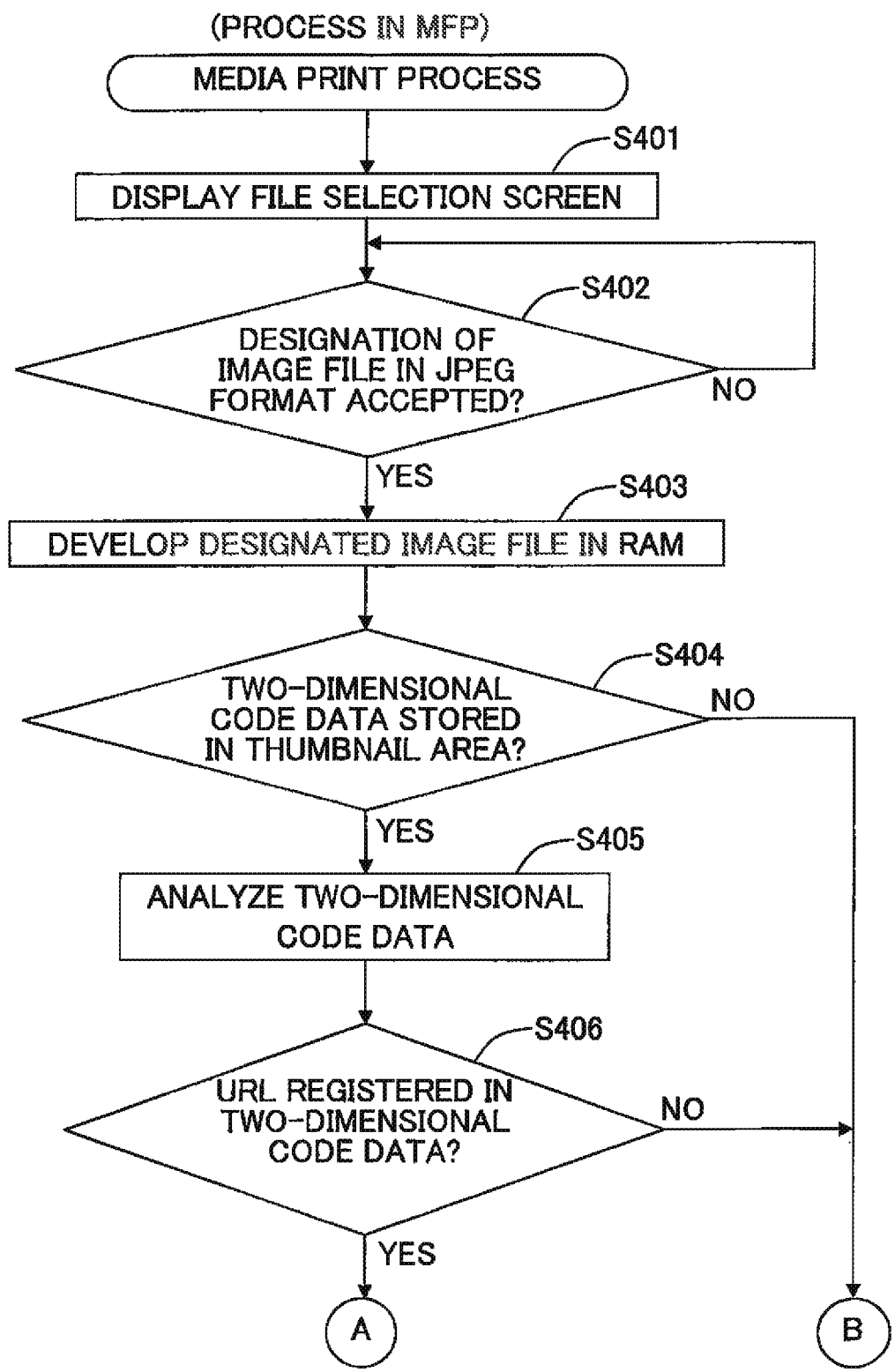

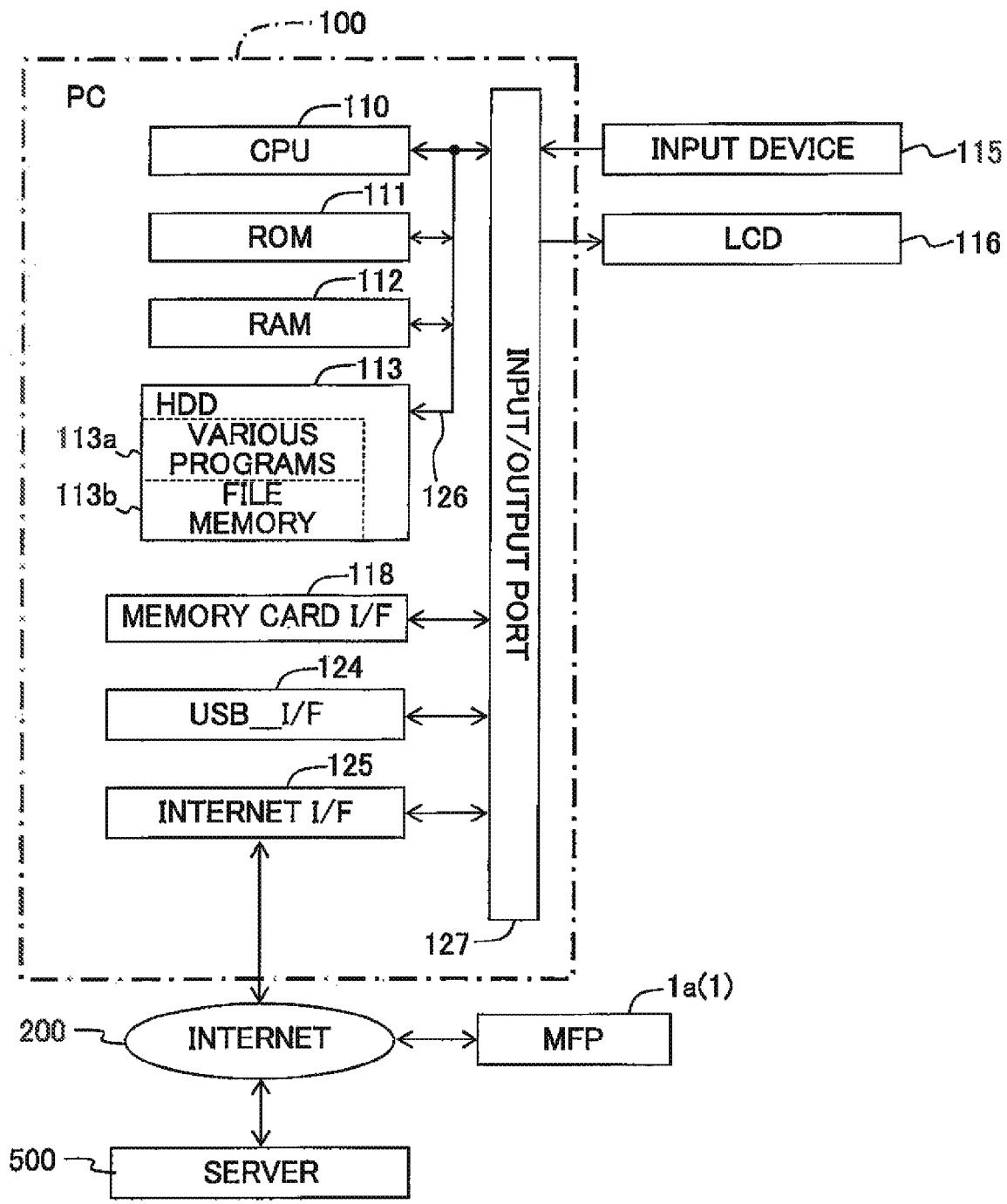

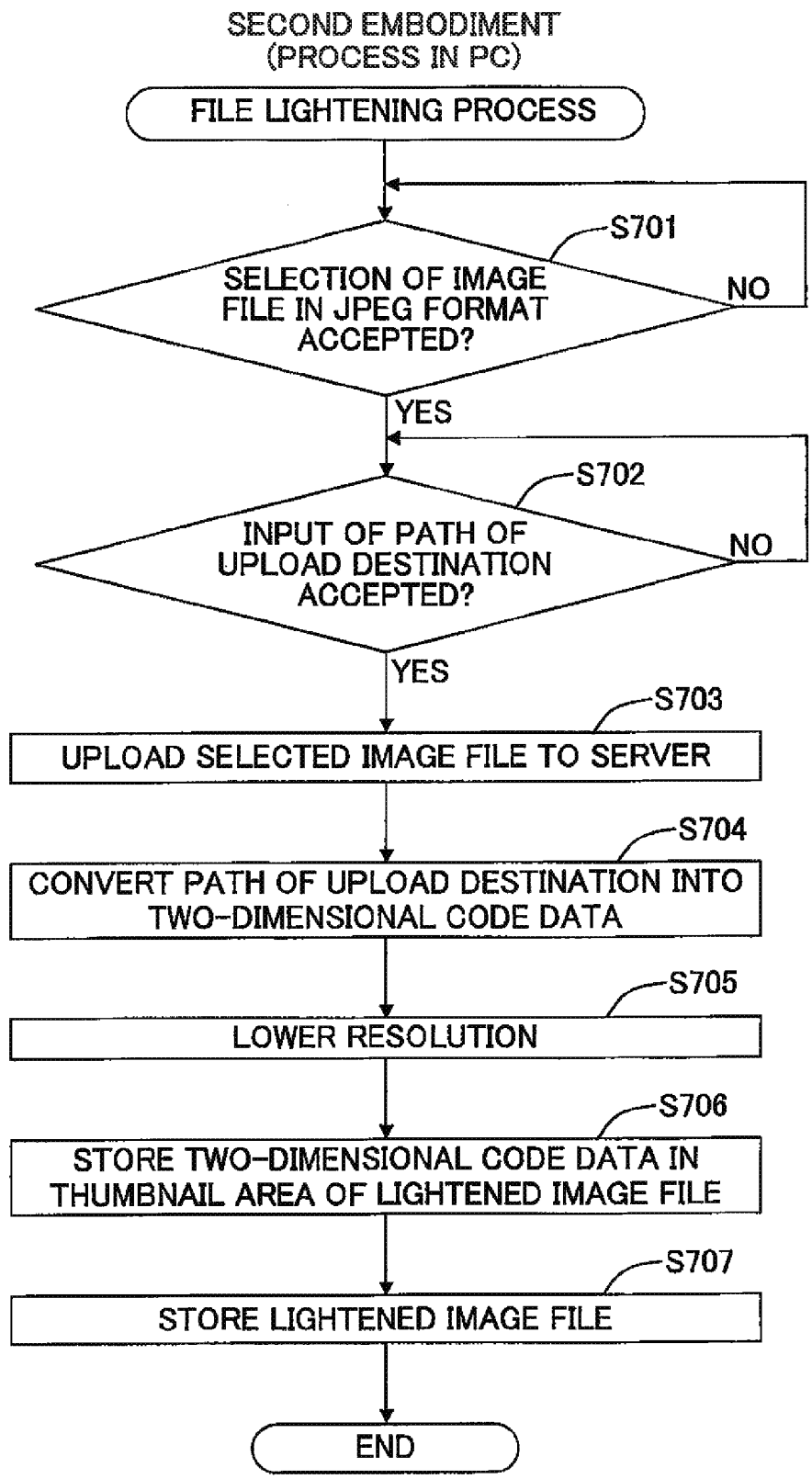

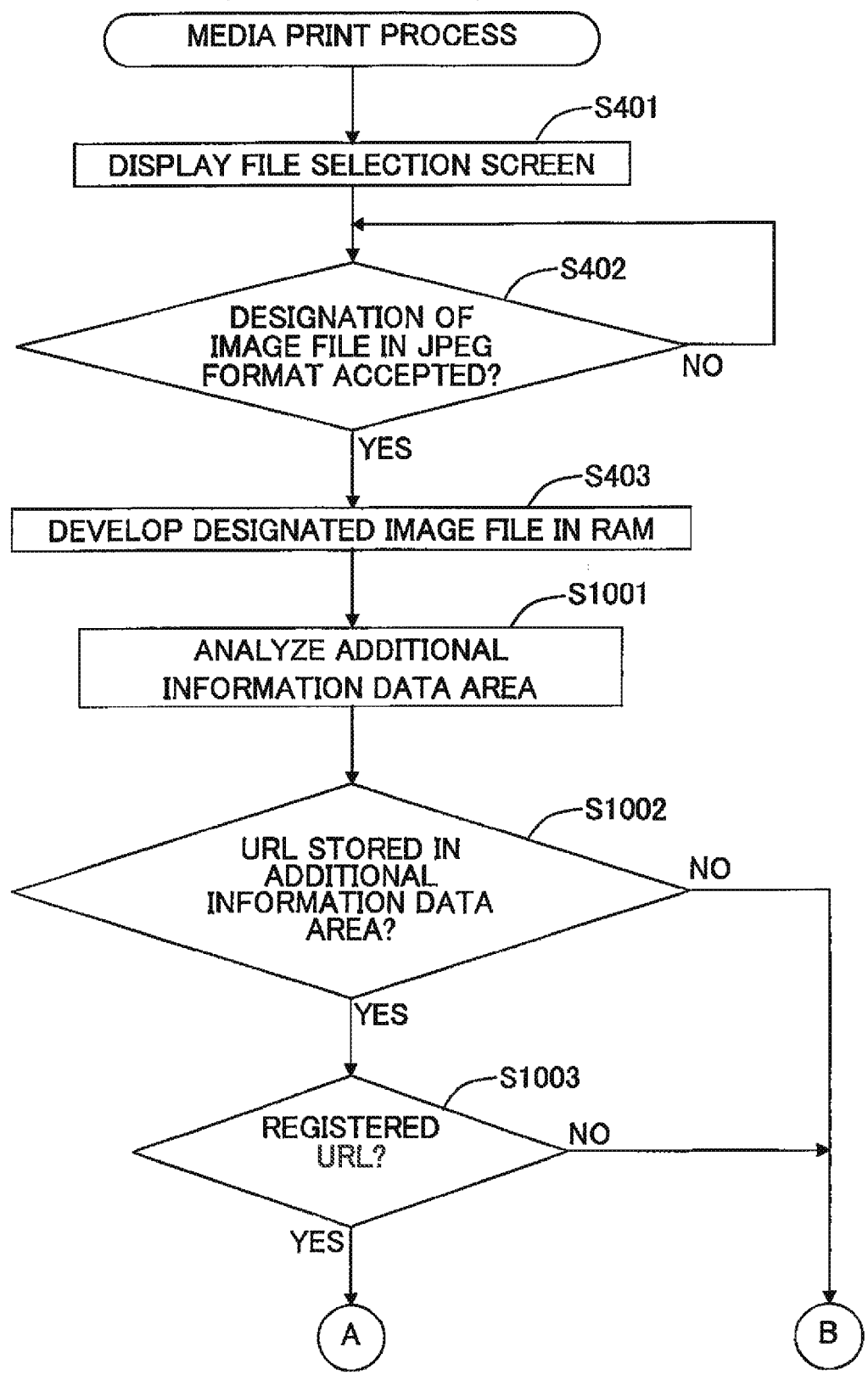

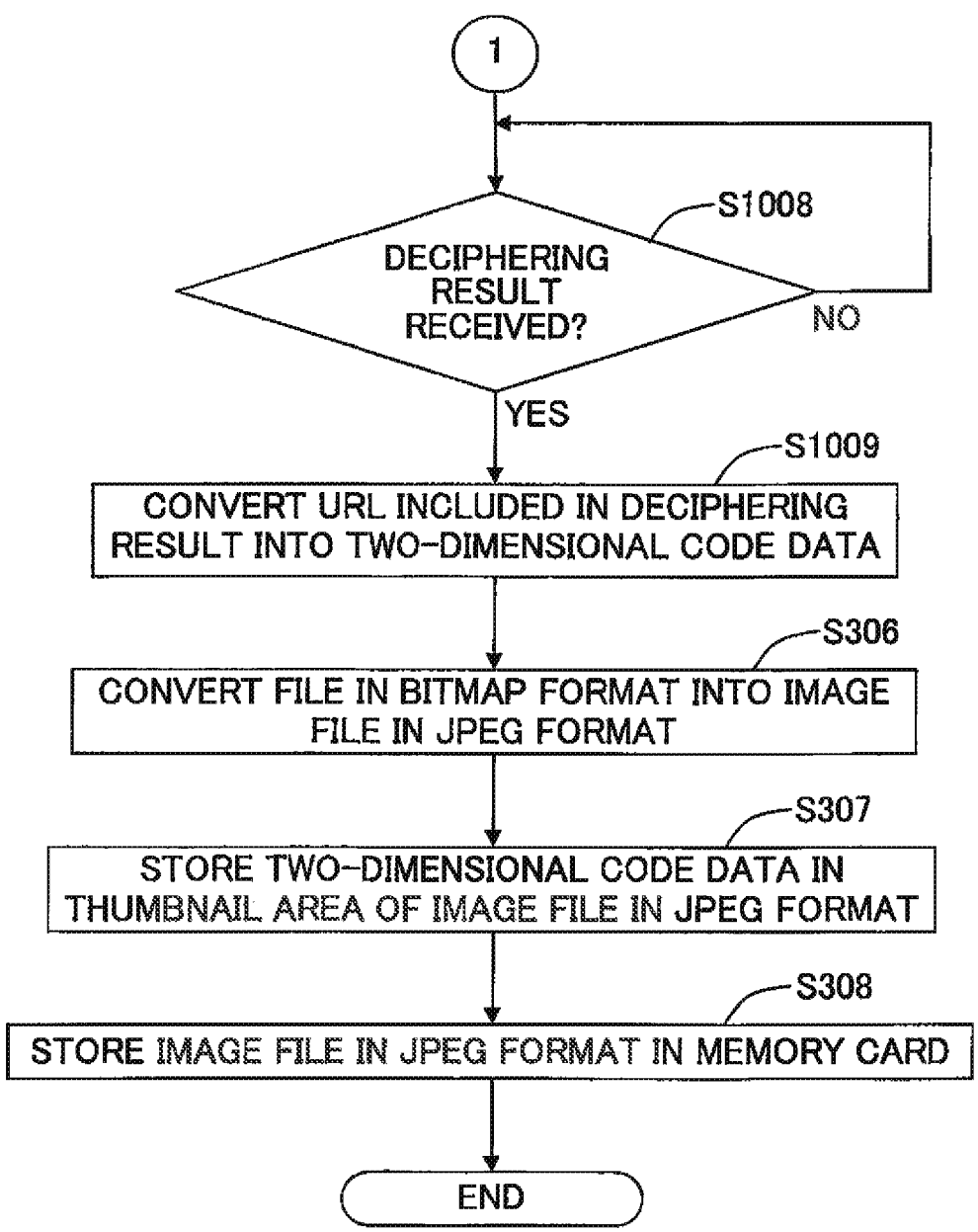

INFORMATION PROCESSING APPARATUS, STORAGE MEDIUM STORED WITH INFORMATION PROCESSING PROGRAM, AND INFORMATION PROCESSING METHOD

CROSS REFERENCE TO RELATED APPLICATION

The present application claims priorities from Japanese Patent Application No. 2011-214142 filed on Sep. 29, 2011, and Japanese Patent Application No. 2012-100731 filed on Apr. 26, 2012, the disclosures of which are incorporated herein by reference in their entirety.

BACKGROUND OF THE INVENTION

1. Field of the Invention

The present invention relates to an information processing apparatus, a storage medium stored with an information processing program, and an information processing method.

2. Description of the Related Art

A situation, in which an undegraded original image or source image in the bitmap format or the like is compressed, often arises, for example, in order to store the image or distribute the image by using the mail or the like. The data size can be lightened by compressing the image. However, the image quality of the compressed image is degraded as compared with the image quality of the original image in many cases. When the compression is the irreversible compression such as the JPEG compression or the like, the image quality, which has been degraded due to the compression, cannot be restored to the image quality of the undegraded original image (i.e., the original image or source image before compression). Therefore, if there is such a possibility that the high quality image may be required after the compression of the image, it is preferable that the original image is uploaded to a server or the like prior to the compression.

Japanese Patent Application Laid-open No. 2006-203317 describes a document management system. In this document management system, an original image, which is inputted from a digital multifunction machine, is uploaded to a document management server by a document management client, while the document management client generates a thinned image from the original image uploaded to the document management server to display the thinned image. According to the document management system as described above, the original image, which cannot be restored from the thinned image, can be acquired from the document management server by the document management client, if necessary.

However, in the case of the technique described in Japanese Patent Application Laid-open No. 2006-203317, the original image, which is uploaded to the document management server, is managed by the linking with an identifier by the document management client. Therefore, the apparatus, which can acquire the original image, is limited to the document management client which is the apparatus of the upload source. Therefore, a problem arises such that even when an original image of an image lightened by a certain apparatus is uploaded to a server by applying the technique described in Japanese Patent Application Laid-open No. 2006-203317, the original image cannot be easily acquired from another apparatus, which is inconvenient.

SUMMARY OF THE INVENTION

The present invention has been made in order to solve the problem as described above, an object of which is to provide an information processing apparatus, a storage medium stored with an information processing program, and an information processing method wherein when a second file is generated from a first file by means of a certain apparatus, the first file can be easily acquired from the second file even by means of any apparatus other than the certain apparatus.

According to an aspect of the present invention, there is provided an information processing apparatus including: a first acquiring controller configured to acquire a first file; a second acquiring controller configured to acquire area information to indicate a storage area, on a predetermined storage medium, which is configured to store the first file acquired by the first acquiring controller; a generating controller configured to generate a second file having an additional information area in which additional information is stored, from the first file acquired by the first acquiring controller; and a storing controller configured to store the area information acquired by the second acquiring controller as the additional information in the additional information area of the second file generated by the generating controller.

The present invention can be constructed in various forms including, for example, a control apparatus for controlling the information processing apparatus, an information processing method, an information processing program for controlling the information processing apparatus, and a storage medium stored with the information processing program.

According to the information processing apparatus of the aspect of the present invention, the area information, which indicates the storage area of the first file acquired by the first acquiring controller, is acquired by the second acquiring controller. The area information, which is acquired by the second acquiring controller, is stored by the storing controller in the additional information area of the second file generated by the generating controller. Therefore, when the second file is generated from the first file by means of the certain apparatus, the information (area information), which indicates the storage area stored with the first file, can be easily acquired from the second file even by means of any apparatus other than the certain apparatus. Therefore, the apparatus other than the certain apparatus can easily acquire the first file as well. The phrase "generates a second file . . . , from the first file acquired by the first acquiring controller", which is referred to in claim 1, intends to include, for example, the generation of the second file by compressing the first file, the conversion from the first file into the second file having any different file format, and the generation of the second file from image data.

BRIEF DESCRIPTION OF THE DRAWINGS

FIG. 3 shows a flow chart illustrating a JPEG process executed in MFP.

FIGS. 4A and 4B show a flow chart illustrating a media print process executed in another apparatus.

FIG. 6 shows a block diagram illustrating an electrical structure or arrangement of a personal computer (PC) as an embodiment of the information processing apparatus of the present invention.

FIG. 7 shows a flow chart illustrating a file lightening process executed in PC.

FIGS. 10A and 10B show a flow chart illustrating a modified embodiment of the media print process executed in another apparatus.

FIGS. 12A and 12B show a flow chart illustrating a JPEG process executed in MFP.

DESCRIPTION OF THE PREFERRED EMBODIMENTS

Figure 1:
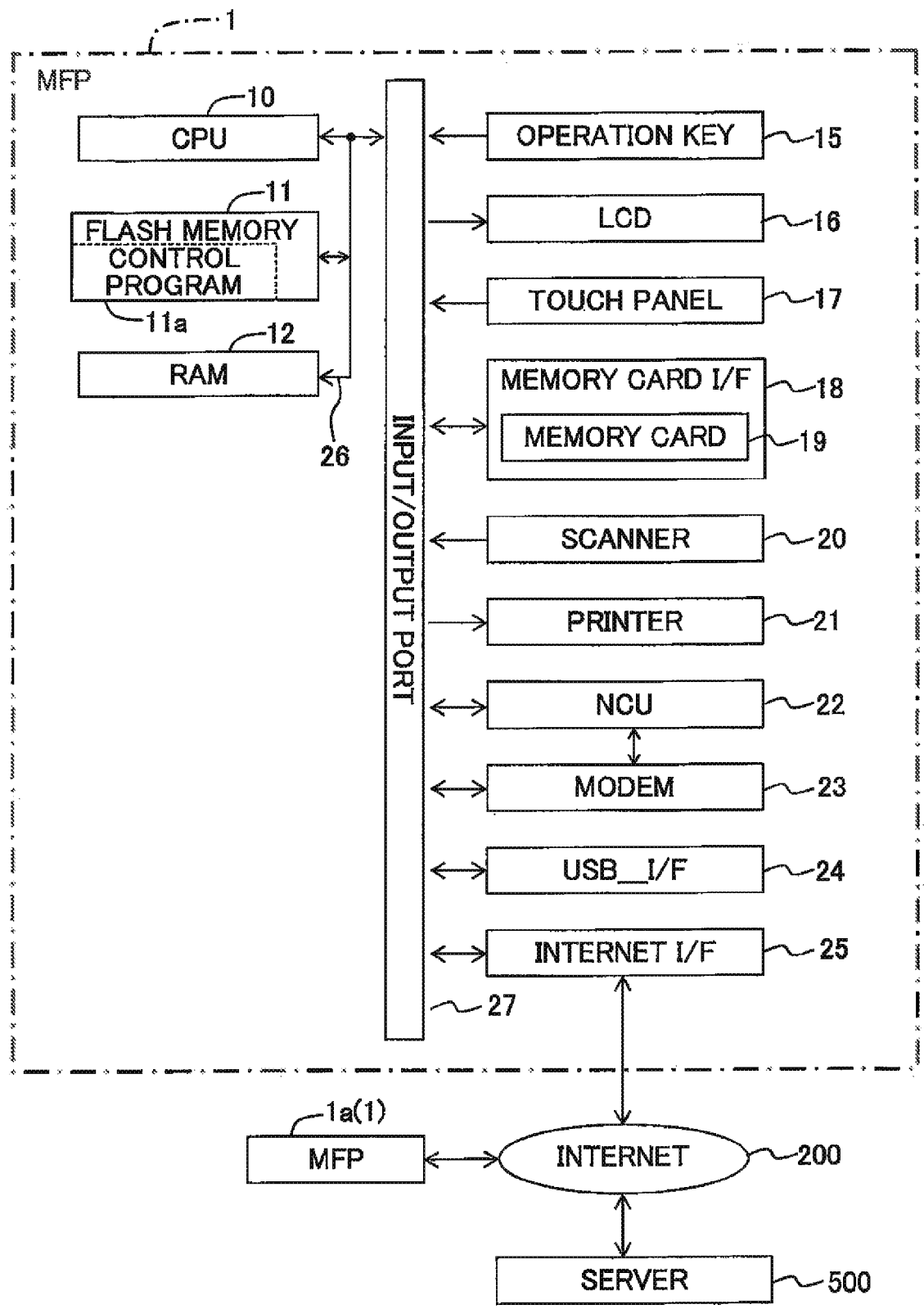
FIG. 1 shows a block diagram illustrating an electrical structure or arrangement of a multifunction peripheral apparatus (MFP) as an embodiment of the information processing apparatus of the present invention.

Preferred embodiments of the present invention will be explained below with reference to the accompanying drawings.

A multifunction peripheral apparatus (hereinafter referred to as "MFP") 1 is a multifunction machine having a plurality of functions including, for example, the printing function, the copy function, the FAX function, the scan function, and the media print function. MFP 1 of this embodiment is constructed as follows. That is, when a manuscript is read by means of the scanner function, a read image is uploaded to a server 500 as an image file in the bitmap format in which the image quality is not degraded. On the other hand, the read image can be stored in a memory card 19 as an image file in the JPEG format in which the data size is small although the image quality is degraded. In particular, MFP 1 of this embodiment is constructed as follows. That is, the information, which indicates the storage position (storage area) of the image file in the bitmap format uploaded to the server 500, is converted into a two-dimensional code, and the data of the two-dimensional code (hereinafter referred to as "two-dimensional code data") is stored (embedded) as the additional information in the image file in the JPEG format. Therefore, even when any other apparatus (for example, MFP 1a) other than MFP 1 is used, the image file of the high quality image (image file in the bitmap format) corresponding to the concerning image file can be downloaded from the server 500 on the basis of the image file in the JPEG format stored (memorized) in the memory card 19. The two-dimensional code is an image in which the information such as text or the like can be stored. QR code (trade name) is an example of the two-dimensional code. The text herein means letters, symbols, numerical values, or combinations thereof.

MFP 1 principally provided with CPU 10, a flash memory 11, RAM 12, an operation key 15, LCD 16, a touch panel 17, a memory card interface (hereinafter referred to as "memory card I/F") 18, a scanner 20, a printer 21, NCU 22, a modem 23, a USB interface (hereinafter referred to as "USB_I/F") 24, and an internet interface (hereinafter referred to as "internet I/F") 25. CPU 10, the flash memory 11, and RAM 12 are connected to one another via a bus line 26. Further, the operation key 15, LCD 16, the touch panel 17, the memory card I/F 18, the scanner 20, the printer 21, NCU 22, the modem 23, USB_I/F 24, internet I/F 25, and the bus line 26 are connected to one another via an input/output port 27.

CPU 10 performs the control of the respective functions possessed by MFP 1 and the control of the respective components connected to the input/output port 27 in accordance with fixed values and programs stored in the flash memory 11, data stored in RAM 12, and/or various signals transmitted/received via NCU 22. The flash memory 11 is a nonvolatile memory in which, for example, a control program 11a for controlling the operation of MFP 1 is stored. Respective processes shown in a flow chart in FIG. 3 described later on are executed by CPU 10 in accordance with the control program 11a. RAM 12 is a rewritable volatile memory in which the information required for the process of CPU 10 is temporarily stored.

The operation key 15 includes hard keys for inputting setting information and instructions into MFP 1. LCD 16 is a liquid crystal display device. The touch panel 17 is provided by being superimposed on LCD 16, with which setting information and instructions are inputted into MFP 1. The memory card I/F 18 is an interface to which the nonvolatile memory card 19 is installed. The memory card I/F 18 controls the writing or the reading of data with respect to the memory card 19. For example, the image file in the JPEG format generated in MFP 1 is stored in the memory card 19. SD card (trade name) is an example of the memory card 19.

The scanner 20 is an apparatus or device with which the manuscript is read, and the image data of the read manuscript is outputted to CPU 10. The printer 21 is an apparatus or device for printing the image on the recording paper. NCU 22 is an apparatus or device for controlling the telephone line. The modem 23 modulates the transmission signal upon the facsimile transmission, and the modem 23 demodulates the received modulated signal upon the facsimile receiving.

USB_I/F 24 is an apparatus or device provided to connect another apparatus so that the communication can be performed via a USB cable, which is composed of any well-known apparatus or device. For example, a personal computer (hereinafter referred to as "PC"), to which a driver program for driving MFP 1 is installed, can be connected to USB_I/F 24 so that the communication can be performed. The internet I/F 25 is an interface provided to connect MFP 1 to the internet 200. For example, a well-known network card can be adopted therefor. The internet I/F 25 is connected to the server 500 via the internet 200. The server 500 is a storage apparatus or device provided to store the image file in the bitmap format received from MFP 1 via the Internet I/F 25 and the internet 200. The server 500 can be also connected to another apparatus such as MFP 1a or the like via the internet 200. It is assumed that MFP 1a shown in FIG. 1 has the same parts or components as those of MFP 1 of this embodiment described above, any explanation of specified parts or components thereof is omitted.

Figure 2:
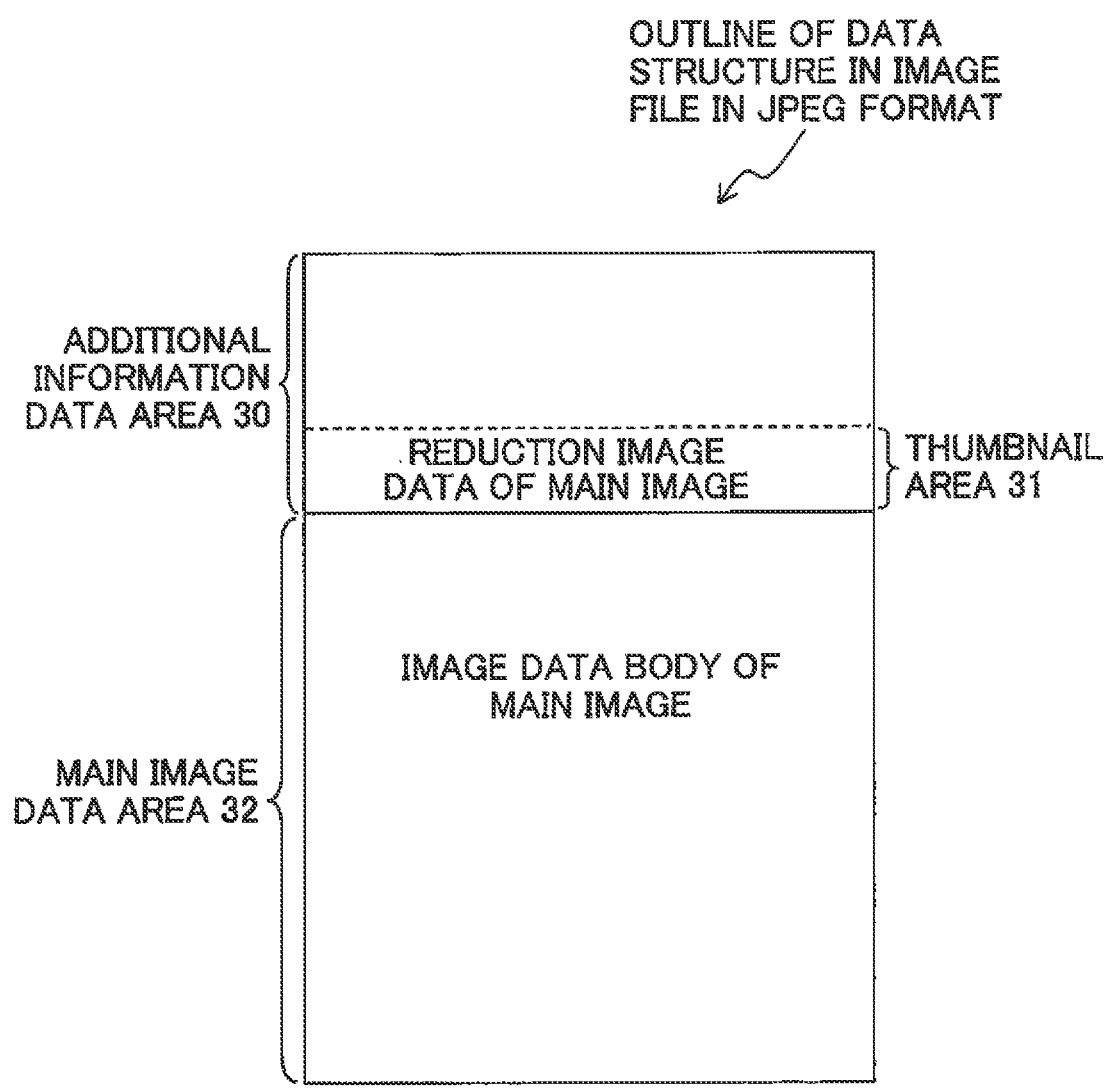
FIG. 2 shows a schematic data structure of an image file in the JPEG format.

As shown in FIG. 2, the image file in the JPEG format has an additional information data area 30 and a main image data area 32. The main image data area 32 is an area for storing the image data of the main image (hereinafter referred to as "main image data"). The additional information data area 30 is an area for storing the additional information in relation to the main image including, for example, the lateral and longitudinal sizes or dimensions of the main image and the resolution of the main image. The additional information data area 30 has a thumbnail area 31. The thumbnail area 31 is an area for storing the image data corresponding to the reduction image of the main image (hereinafter referred to as "reduction image data"). The data structures of, for example, the additional information data area 30, the thumbnail area 31, and the main image data area 32 are defined as the Exif standard by JEIDA (Japan Electronic Industry Development Association). In this embodiment, the two-dimensional code data is stored in the thumbnail area 31 for storing the reduction image data.

Next, an explanation will be made with reference to FIG. 3 about the JPEG compression process executed by CPU 10 of MFP 1. The JPEG compression process is a process to be performed in order to generate the image file in the JPEG format from the image data of the manuscript read by the scanner 20. This process is executed if the reading of the manuscript is instructed to the scanner 20 by a user in such a state that the JPEG format is designated as the storage format and the image file in the bitmap format is designated to be uploaded to the server 500.

At first, CPU 10 allows the scanner 20 to read the manuscript (S301). Subsequently, CPU 10 generates the image file in the bitmap format from the image data of the manuscript obtained by the reading (S302). Subsequently, CPU 10 allows LCD 16 to display a path input screen (not shown). CPU 10 accepts the input of the path (URL) to indicate the upload destination (storage position in the server 500) of the image file in the bitmap format on the path input screen (S303). Incidentally, the input of the path is performed by operating the touch panel 17 by the user. In this procedure, if URL is not inputted on the path input screen (S303: No), CPU 10 returns the process to S303.

On the other hand, if CPU 10 accepts the input of URL (S303: Yes), CPU 10 uploads the image file in the bitmap format generated in S302 to the storage area of the server 500 indicated by inputted URL (S304). It is noted that the image file in the bitmap format is not erased from MFP 1. Subsequently, CPU 10 converts URL inputted on the path input screen into the two-dimensional code data (S305). URL, which is inputted on the path input screen, is the text data. The method for generating the two-dimensional code data (QR code (trade name) data) from the text data is a known technique, and hence any explanation thereof is omitted. This technique is described, for example, in "Introduction of Code Theory", written by Susumu HAMAYA, published by Kohgaku-Sha Co., Ltd. in 2008/7.

Subsequently, CPU 10 converts (compresses) the image file in the bitmap format into the image file in the JPEG format. Subsequently, CPU 10 stores the two-dimensional code data generated in S305 in the thumbnail area 31 of the obtained image file in the JPEG format (S307). Further, the image file in the JPEG format is stored in the memory card 19 (S308), and this process is completed.

According to the JPEG compression process of this embodiment, the image data of the manuscript, which is read by the scanner 20, is stored as the compressed image file in the JPEG format in the memory card 19 on one hand, and the high quality image data before the compression can be stored as the image file in the bitmap format in the server 500 on the other hand. In this procedure, the two-dimensional code data, which indicates the upload destination (storage position in the server 500) of the image file in the bitmap format, is stored in the thumbnail area 31 of the image file in the JPEG format stored in the memory card 19. When the memory card 19 is installed to any apparatus (for example, MFP 1a) other than MFP 1, then the apparatus other than MFP 1 can easily acquire the storage position of the image file of the high quality image before the compression (image file in the bitmap format) on the basis of the two-dimensional code data stored in the thumbnail area 31 of the image file in the JPEG format, and the download can be easily performed from the server 500.

Figure 4B:
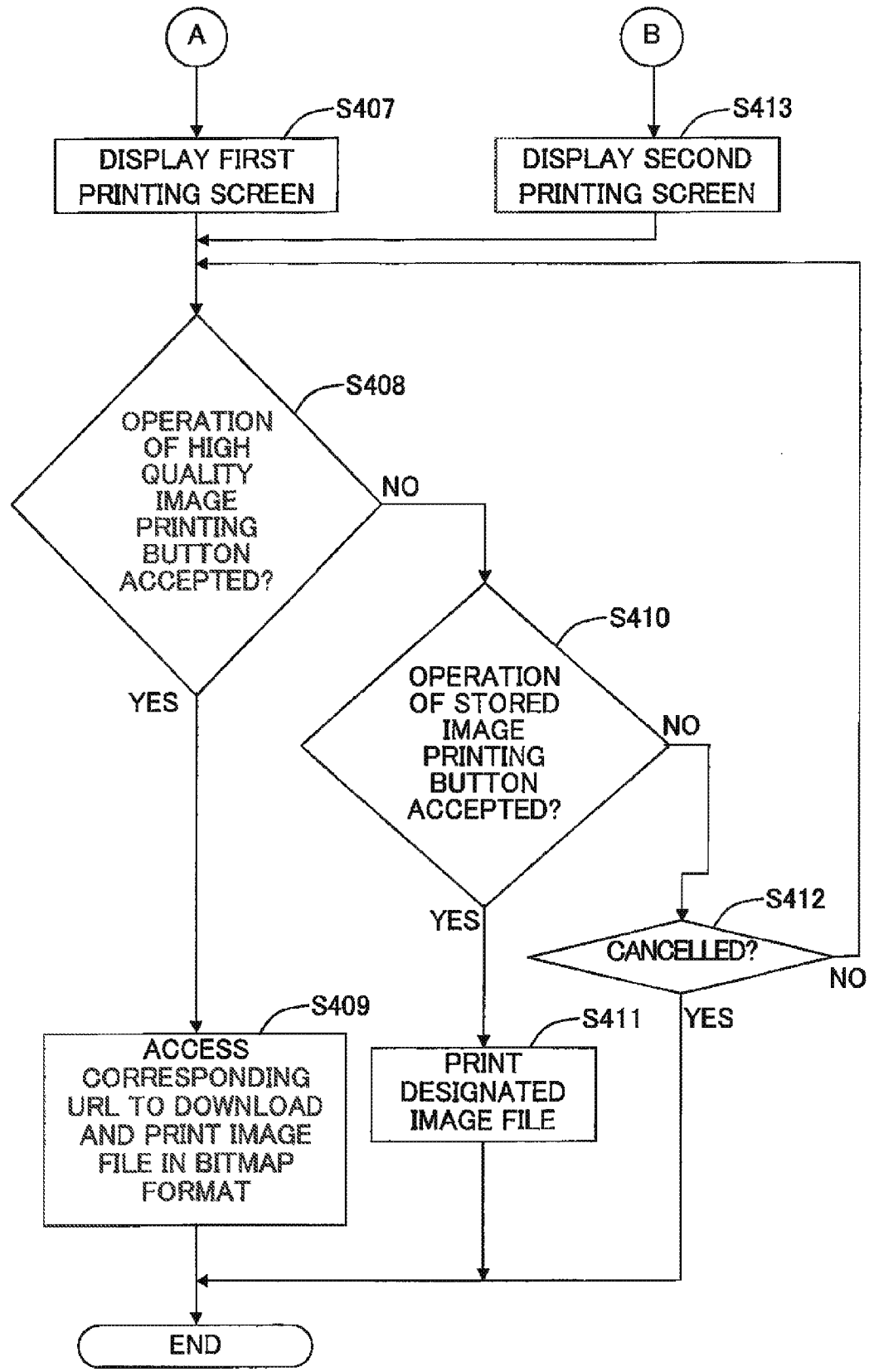

Next, an explanation will be made with reference to FIG. 4 about such a specified example that the image file in the bitmap format, which corresponds to the image file in the JPEG format generated in the JPEG compression process and stored in the memory card 19 as described above, is downloaded from the server 500 by any apparatus (MFP 1a) other than MFP 1. A media print process shown in FIG. 4 is executed when the memory card 19 is installed to the memory card I/F 18 of MFP 1a and the execution of the media print function is instructed by a user.

At first, CPU 10 displays a file selection screen (not shown) on LCD 16 (S401). On the file selection screen, CPU 10 judges whether or not the designation of the image file in the JPEG format is accepted (S402). If the designation of the image file in the JPEG format is not accepted (S402: No), CPU 10 returns the process to S402. On the other hand, if the designation of one image file in the JPEG format is accepted (S402: Yes), CPU 10 develops the designated image file in the JPEG format in RAM 12 (S403).

Subsequently, CPU 10 judges whether or not the two-dimensional code data is stored in the thumbnail area 31 of the designated image file (S404). Specifically, the data, which is stored in the thumbnail area 31, is extracted to judge whether or not the image, which corresponds to the data, is the two-dimensional code. The method for judging whether or not the image is the two-dimensional code is a known technique, any explanation of which is omitted. This technique is used, for example, for the bar code (QR code (trade name)) reader function of the mobile phone. If the two-dimensional code data is stored (S404: Yes), CPU 10 analyzes the two-dimensional code data (S405) to judge whether or not URL is registered in the two-dimensional code data (S406). If URL is registered in the two-dimensional code data (S406: Yes), then CPU 10 allows LCD 16 to display a first printing screen 50a (see FIG. 5A), and the process is allowed to proceed to S408. As described later on with reference to FIG. 5A, a stored image printing button 51a for instructing the printer 21 to print the image file of the designated JPEG image and a high quality image printing button 51b for instructing the printer 21 to print the corresponding image file in the bitmap format stored in the server 500 are displayed on the first printing screen 50a.

On the other hand, if URL is not registered in the two-dimensional code data (S406: No), then CPU 10 allows LCD 16 to display a second printing screen 50b (see FIG. 5B) (S413), and the process is allowed to proceed to S408. As described later on with reference to FIG. 5B, the stored image printing button 51a is displayed on the second printing screen 50b, but the high quality image printing button 51b is not displayed unlike the first printing screen 50a. If the two-dimensional code data is not stored in the thumbnail area 31 of the designated image file (S404: No), then CPU 10 also allows LCD 16 to display the second printing screen 50b (see FIG. 5B) (S413), and the process is allowed to proceed to S408 as well.

Subsequently, CPU 10 judges whether or not the operation of the high quality image printing button 51b is accepted on the first printing screen 50a (S408). If the operation of the high quality image printing button 51b is accepted (S408: Yes), CPU 10 accesses URL corresponding to the high quality image printing button 51b (i.e., URL registered in the two-dimensional code data) via the internet I/F 25 to download the image file in the bitmap format corresponding to the designated image file in the JPEG format. Further, the image of the downloaded image file in the bitmap format is printed by the printer 21 (S409), and this process is completed.

On the other hand, if the operation of the high quality image printing button 51b is not accepted on the first printing screen 50a (S408: No), and the operation of the stored image printing button 51a is accepted on the first printing screen 50a or the second printing screen 50b (S410: Yes), then CPU 10 allows the printer 21 to print the printing objective of the designated image file, specifically the image of the main image data stored in the main image data area 32 if the image file in the JPEG format is designated (S411), and this process is completed.

If CPU 10 does not accept the operation of the stored image printing button 51a on the first or second printing screen 50a, 50b (S410: No), and CPU 10 accepts the operation of a cancel button 52 (see FIG. 5) (S412: Yes), then CPU 10 completes this process. On the other hand, if the operation of the stored image printing button 51a is not accepted on the first or second printing screen 50a, 50b (S410: No), and the operation of the cancel button 52 is not accepted as well (S412: No), then CPU 10 returns the process to S408.

Next, the first printing screen 50a and the second printing screen 50b described above will be specifically explained with reference to FIGS. 5A and 5B.

Figure 5A:
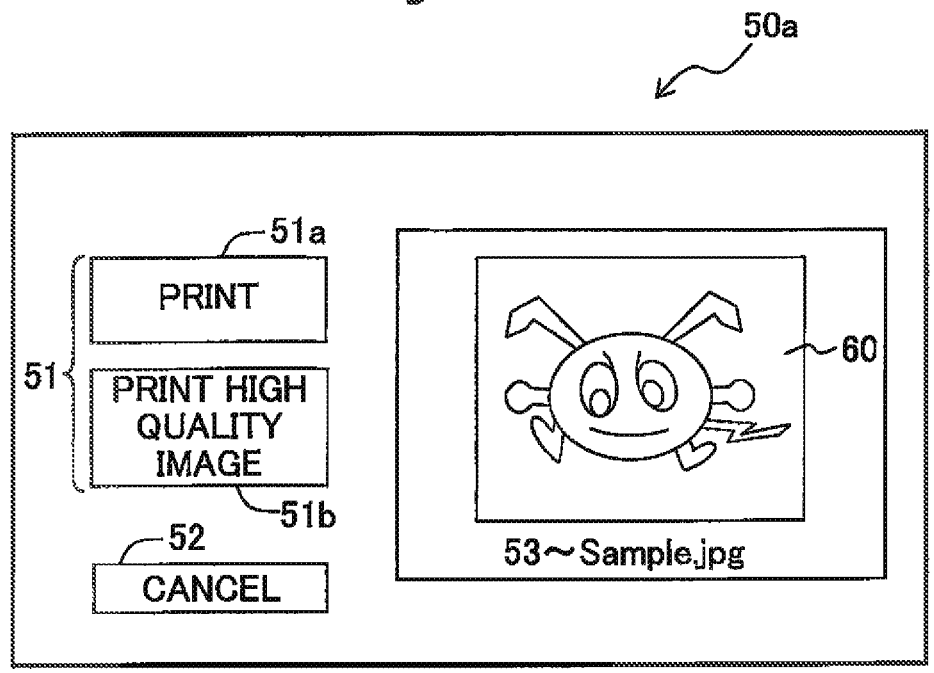
FIGS. 5A and 5B schematically show examples of first and second printing screens displayed on LCD in accordance with the media print process shown in FIGS. 4A and 4B.
Figure 5B:
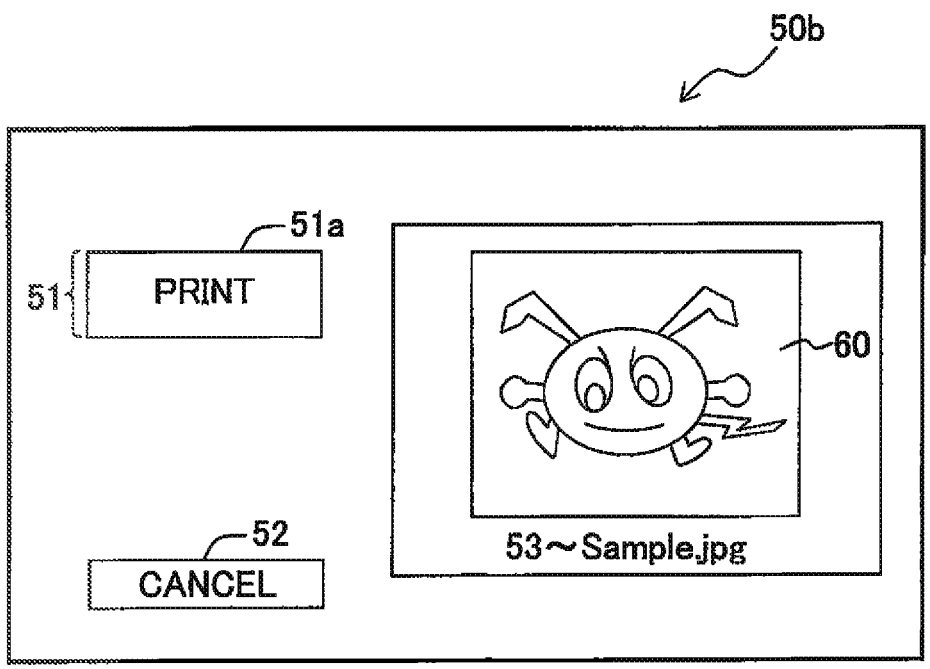

As shown in FIGS. 5A and 5B, the printing button 51, the cancel button 52, a file name 53 of the image file as the objective of the media print process shown in FIG. 4 (i.e., the designated image file), and a reduction image 60 corresponding to the image file are displayed on any one of the first printing screen 50a and the second printing screen 50b. The image, which corresponds to the file format of the image file as the objective of the media print process, is displayed as the reduction image 60. In particular, in the case of the image file in the JPEG format, the reduction image (thumbnail image) of the main image is displayed.

The printing button 51 on the first printing screen 50a is composed of the stored image printing button 51a indicated as "PRINT", and the high quality image printing button 51b indicated as "PRINT HIGH QUALITY IMAGE". In contrast thereto, the printing button 51 on the second printing screen 50b is composed of the stored image printing button 51a, and the printing button 51 does not include the high quality image printing button 51b. As described above, if the stored image printing button 51a is operated on the first or second printing screen 50a, 50b, MFP 1a allows the printer 21 to print the image of the designated image file. On the other hand, if the high quality image printing button 51b is operated on the first printing screen 50a, then MFP 1a downloads the image file in the bitmap format corresponding to the designated image file in the JPEG format from the server 500, and MFP 1a allows the printer 21 to print the image.

As described above, MFP 1a analyzes the two-dimensional code data stored in the image file in the JPEG format stored in the memory card 19. Further, the image file in the bitmap format, which corresponds to the image file in the JPEG format, can be downloaded from the storage position indicated by URL registered in the two-dimensional code data (storage position in the server 500 in this embodiment), and the printing can be performed with the printer 21. MFP 1 of this embodiment is constructed such that the two-dimensional code data, which corresponds to URL (path) to indicate the upload destination of the image file in the bitmap format, is stored as the additional information in the thumbnail area 31 of the image file in the JPEG format corresponding to the image file in the bitmap format. Therefore, when the image is converted by using the certain apparatus to generate the lightened compressed image, then the concerning compressed image can be not only acquired even by using any other apparatus, but the high quality original image before the compression can be also acquired with ease.

The specified example, in which the image file in the bitmap format corresponding to the image file in the JPEG format stored in the memory card 19 in the JPEG compression process shown in FIG. 3 is downloaded from the server 500 by the apparatus other than MFP 1, is not limited to the media print process described above. Another example is also available. That is, the two-dimensional code data, which is stored in the thumbnail area 31 of the image file in the JPEG format, may be displayed as the reduction image (thumbnail image) of the two-dimensional code on the display screen such as LCD or the like. The two-dimensional code may be read by an apparatus (for example, PC) on which the two-dimensional code reader function is carried. The image file in the bitmap format as the objective may be downloaded from the server 500.

Next, a second embodiment will be explained with reference to FIGS. 6 and 7. In the first embodiment described above, when the manuscript is read by the scanner function of MFP 1, the two-dimensional code data, which indicates the storage position of the corresponding image file in the bitmap format, is stored in the thumbnail area 31 of the image file of the read image stored in the JPEG format. In contrast thereto, in the second embodiment, an image file in the JPEG format, which is stored in PC, is compressed and lightened, while the two-dimensional code data, which indicates a storage position of the image file as the source of compression (before the compression), is stored in a thumbnail area 31 of an image file after the compression. In the second embodiment, the same parts or components as those of the first embodiment described above are designated by the same reference numerals, any explanation of which will be omitted.

As shown in FIG. 6, PC 100 of this embodiment is constructed such that the image file before the compression (i.e., image file stored in HDD 113) can be uploaded to the server 500, when the image file in the JPEG format, which is stored in the internal or built-in hard disk drive (hereinafter referred to as "HDD") 113, is compressed and lightened. Further, PC 100 of this embodiment is constructed such that the two-dimensional code data, which indicates the storage position of the image file uploaded to the server 500 (image file before the compression), is stored as the additional information in the image file in the JPEG format after the compression, in the same manner as MFP 1 described above. Therefore, even in the case of any apparatus (for example, MFP 1a) other than PC 100, the image file before the compression can be downloaded from the server 500 by making reference to the image file after the compression stored in HDD 113.

PC 100 is principally provided with CPU 110, ROM 111, RAM 112, HDD 113, memory card I/F 118, USB_I/F 124, and internet I/F 125. CPU 110, ROM 111, RAM 112, and HDD 113 are connected to one another via a bus line 126. The memory card I/F 118, USB_I/F 124, the internet I/F 125, and the bus line 126 are connected to one another via an input/output port 127. LCD 116 and an input device 115 such as an external keyboard, a mouse or the like are connected to the input/output port 127.

CPU 110 performs the control of the respective components possessed by PC 100 and the control of the respective components connected to the input/output port 127 in accordance with fixed values and programs stored in ROM 111 and HDD 113 and/or data stored in RAM 112. ROM 112 is an unrewritable nonvolatile memory in which the programs or the like are stored in order to control the operation of PC 100. RAM 112 is a rewritable volatile memory in which the information required for the process of CPU 110 is temporarily stored.

HDD 113 is a rewritable nonvolatile storage device, in which various programs 113a are stored. The various programs 113a are constructed to include, for example, driver programs and various application programs installed by a user. Respective processes shown in a flow chart in FIG. 7 described later on are executed by the application program included in the various programs 113a. When the driver program for controlling MFP 1 is installed as one of the various programs 113a, the respective functions (for example, the scanner function) of MFP 1 connected via USB_I/F 124 can be controlled from PC 100. Further, HDD 113 has a file memory 113b. The file memory 113b is an area for storing the file such as the image file or the like memorized (stored) by the user.

The memory card I/F 118 is a device which is the same as or equivalent to the memory card I/F 18 described above. The memory card I/F 118 controls the writing or the reading of the data with respect to the installed memory card 19. USB_I/F 124 is a device which is the same as or equivalent to USB_I/F 24 described above. For example, MFP 1 can be connected to a USB cable via USB_I/F 124 so that the communication can be performed. The internet I/F 125 is a device which is the same as or equivalent to the internet I/F 25 described above. The internet I/F 125 is connected to the server 500 via the internet 200.

Next, an explanation will be made with reference to a flow chart shown in FIG. 7 about the file lightening process executed by CPU 110 of PC 100. The file lightening process is such a process that the image file in the JPEG format, which is included in the files stored in the file memory 113b, is compressed and lightened. This process is executed if one image file in the JPEG format, which is stored in the file memory 113b, is selected (designated) in such a state that the lightening (compression) of the image file is designated and the upload of the image file before the compression to the server 500 is designated.

At first, CPU 110 judges whether or not the selection of the image file in the JPEG format is accepted (S701). If the selection of the image file in the JPEG format is not accepted (S701: No), CPU 110 returns the process to S701. On the other hand, if the selection of the image file in the JPEG format from the files stored in the file memory 113b is accepted (S701: Yes), CPU 110 allows LCD 116 to display a path input screen (not shown). Further, the input of the path (URL) to indicate the upload destination of the image file before the compression is accepted on the path input screen (S702). The input of the path is performed by operating the input device 115 by a user. In this procedure, if URL is not inputted on the path input screen (S702: No), CPU 110 returns the process to S702.

On the other hand, if CPU 110 accepts the input of URL (S702: Yes), CPU 110 uploads the image file before the compression selected by the user to the storage position in the server 500 indicated by inputted URL (S703). The image file before the compression selected by the user is also allowed to remain in PC 100. Subsequently, CPU 110 converts URL inputted on the path input screen into the two-dimensional code data (S704).

Subsequently, CPU 110 performs the compression (conversion) of the file by thinning out the pixels of the image of the image file in the JPEG format allowed to remain in PC 100 (S705). Subsequently, CPU 110 stores the two-dimensional code data generated in S704 in the thumbnail area 31 of the image file after the compression (image file in the JPEG format) (S706). The image file is stored in the file memory 113b (S707), and this process is completed.

According to the file lightening process of this embodiment, the two-dimensional code data, which indicates the upload destination of the image file before the compression, is stored in the thumbnail area 31 of the image file in the JPEG format after the compression. Therefore, even in the case of any apparatus (for example, MFP 1a) other than PC 100, the image file before the compression, which corresponds to the image file after the compression, can be easily downloaded from the server 500 on the basis of the two-dimensional code data stored in the thumbnail area 31 of the image file after the compression, in the same manner as in the first embodiment described above.

Next, a third embodiment will be explained with reference to FIG. 8. In this third embodiment, a file, which is stored in PC, is converted into a file in the PDF format, while the file as the source of conversion (before the conversion) is uploaded as the master data to the server. As described above, the image file in the JPEG format has the thumbnail area 31. However, the file in the PDF format also has a similar thumbnail area. In this embodiment, the two-dimensional code data, which indicates a storage position of the image file as the source of conversion, is stored in the thumbnail area of the file in the PDF format obtained by the conversion. In the third embodiment, the same parts or components as those of the respective embodiments described above (first and second embodiments) are designated by the same reference numerals, any explanation of which will be omitted.

Figure 8:
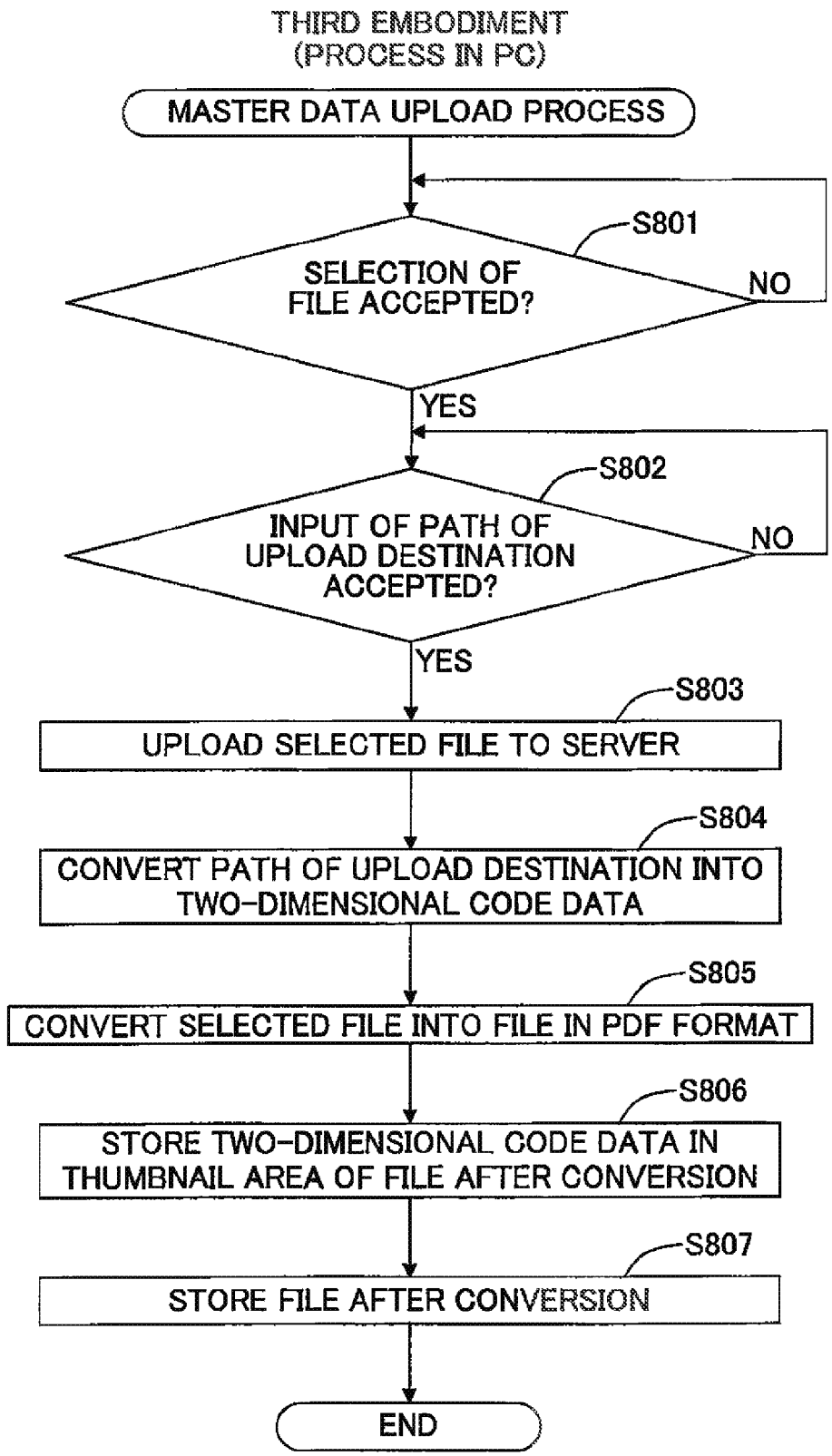
FIG. 8 shows a flow chart illustrating a master data upload process executed in PC.

The master data upload process shown in FIG. 8 is such a process that one file selected by the user, which is included in the files stored in the file memory 113b, is converted into the file in the PDF format, and the file as the source of conversion is uploaded as the master data to the server 500. The respective processes shown in a flow chart in FIG. 8 are executed by the application program included in the various programs 113a. This process is executed if one file, which is stored in the file memory 113b, is selected (designated) in such a state that the conversion of the selected (designated) file into the PDF format is designated and the upload of the file before the conversion to the server 500 is designated.

At first, CPU 110 judges whether or not the selection of the file to be converted into the PDF format is accepted (S801). If the selection of the file to be converted into the PDF format is not accepted (S801: No), CPU 110 returns the process to S801. On the other hand, if the selection of one file to be converted into the PDF format is accepted (S801: Yes), CPU 110 allows LCD 116 to display a path input screen (not shown). Further, the input of the path (URL) to indicate the upload destination of the file as the source of conversion is accepted on the path input screen (S802). The path is inputted by operating the input device 115 by the user. In this procedure, if URL is not inputted on the path input screen (S802: No), CPU 110 returns the process to S802.

On the other hand, if CPU 110 accepts the input of URL (S802: Yes), CPU 110 uploads the file selected by the user (i.e., the file as the source of conversion) as the master data to the storage position of the server 500 indicated by inputted URL (S803). The file as the source of conversion selected by the user is also allowed to remain in PC 100. Subsequently, CPU 110 converts URL inputted into the path input screen into the two-dimensional code data (S804).

Subsequently, CPU 110 converts the file as the source of conversion (i.e., the file selected by the user) allowed to remain in PC 100 into the file in the PDF format (S805). Subsequently, CPU 110 stores the two-dimensional code data generated in S804 in the thumbnail area (not shown) of the file in the PDF format obtained by the conversion (S806). The file after the conversion, which includes the two-dimensional code data stored in the thumbnail area, is stored in the file memory 113b (S807), and this process is completed.

According to the master data upload process of this embodiment, the two-dimensional code data, which indicates the upload destination of the master data (i.e., the file as the source of conversion), is stored in the thumbnail area of the file after the conversion (file in the PDF format). Therefore, even in the case of any apparatus (for example, MFP 1a) other than PC 100, the master data can be easily downloaded from the server 500 on the basis of the two-dimensional code data stored in the thumbnail area of the file after the conversion, in the same manner as in the first and second embodiments described above.

Next, a fourth embodiment will be explained with reference to FIG. 9. In the fourth embodiment, a file, which is stored in PC, is converted into a file in the PDF format, and the file is distributed to another apparatus. In this procedure, the file as the source of conversion (before the conversion) is allowed to remain in the certain apparatus. The information, which indicates the storage position of the file as the source of conversion in the certain apparatus, is converted into the two-dimensional code, and the two-dimensional code data thereof is stored in a thumbnail area of the file in the PDF format obtained by the conversion (i.e., the file for the distribution). In the fourth embodiment, the same parts or components as those of the respective embodiments described above (first, second, and third embodiments) are designated by the same reference numerals, any explanation of which will be omitted.

Figure 9:
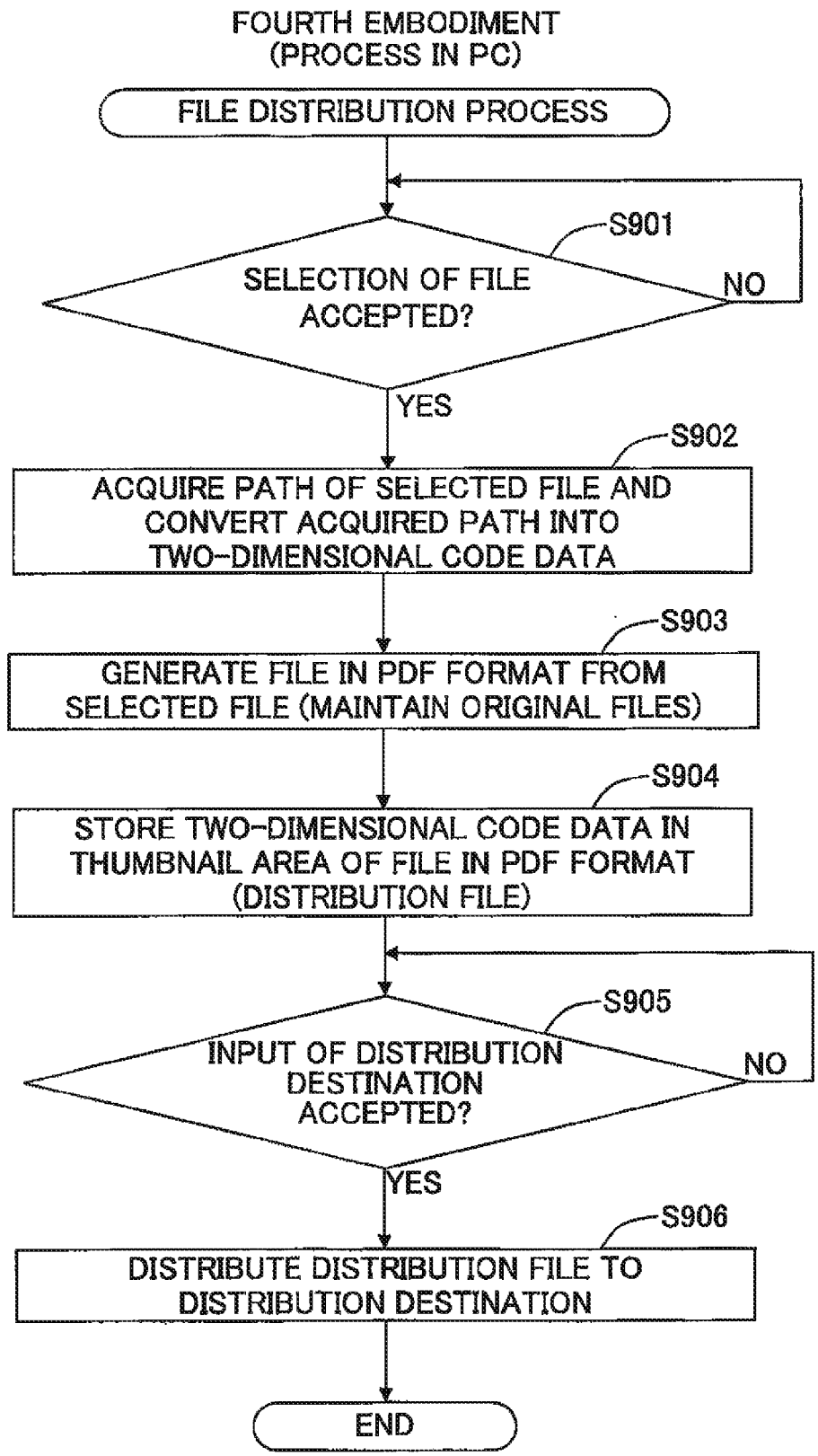
FIG. 9 shows a flow chart illustrating a file distribution process executed in PC.

The file distribution process shown in FIG. 9 is such a process that one file selected by the user, which is included in the files stored in the file memory 113b, is converted into the PDF format, and the obtained file is distributed to another apparatus. The respective processes shown in a flow chart in FIG. 9 are executed by the application program included in the various programs 113a. This process is executed if one file, which is stored in the file memory 113b, is selected (designated) in such a state that the distribution of the file to another apparatus is designated.

At first, CPU 110 judges whether or not the selection of the file as the distribution objective is accepted (S901). If the selection of the file as the distribution objective is not accepted (S901: No), CPU 110 returns the process to S901. On the other hand, if the selection of one file as the distribution objective is accepted (S901: Yes), then CPU 110 acquires the path of a storage position of the selected file, and the acquired path is converted into the two-dimensional code data (S902).

Subsequently, CPU 110 generates the file in the PDF format from the file selected by the user (S903). In S903, the file as the source of conversion (i.e., the file selected by the user) is allowed to remain in PC 100 without changing the storage position. Subsequently, CPU 110 stores the two-dimensional code data generated in S902 in the thumbnail area (not shown) of the file in the PDF format generated as the file for the distribution (S904).

Subsequently, CPU 110 allows LCD 116 to display a distribution destination input screen (not shown) to accept the input of the information (for example, mail address of unillustrated another PC connected to the internet 200) which indicates the distribution destination of the distribution file on the distribution destination input screen (S905). In this procedure, if the distribution destination is not inputted on the distribution destination input screen (S905: No), CPU 110 returns the process to S905. On the other hand, if CPU 110 accepts the input of the distribution destination (S905: Yes), then CPU 110 distributes the distribution file having the two-dimensional code data stored in the thumbnail area to the inputted distribution destination (S906), and this process is completed.

According to the file distribution process of this embodiment as described above, the two-dimensional code data which indicates the storage position of the file as the source of conversion (storage position of the concerning file in the file memory 113b in this embodiment), is stored in the thumbnail area of the file in the PDF format converted for the distribution. Any apparatus other than PC 100 (for example, unillustrated another PC connected to the internet 200) can easily acquire the storage position of the file as the source of conversion on the basis of the two-dimensional code data stored in the thumbnail area of the file distributed from PC 100, in the same manner as in the first to third embodiments described above. Therefore, it is possible to acquire the file as the source of conversion from PC 100.

Figure 11:
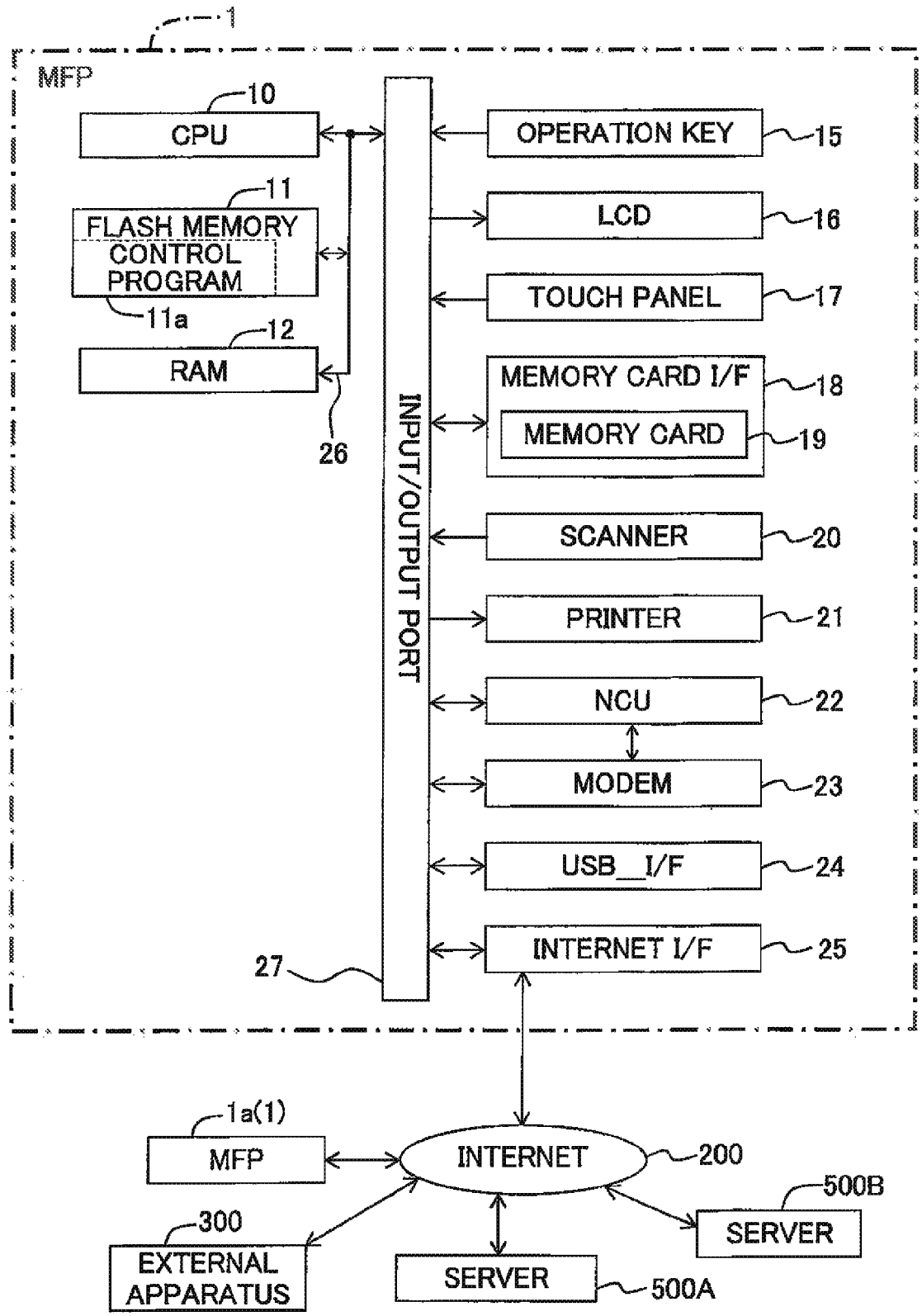
FIG. 11 shows a block diagram illustrating an electrical structure or arrangement of MFP as an embodiment of the information processing apparatus of the present invention.
Figure 12A:
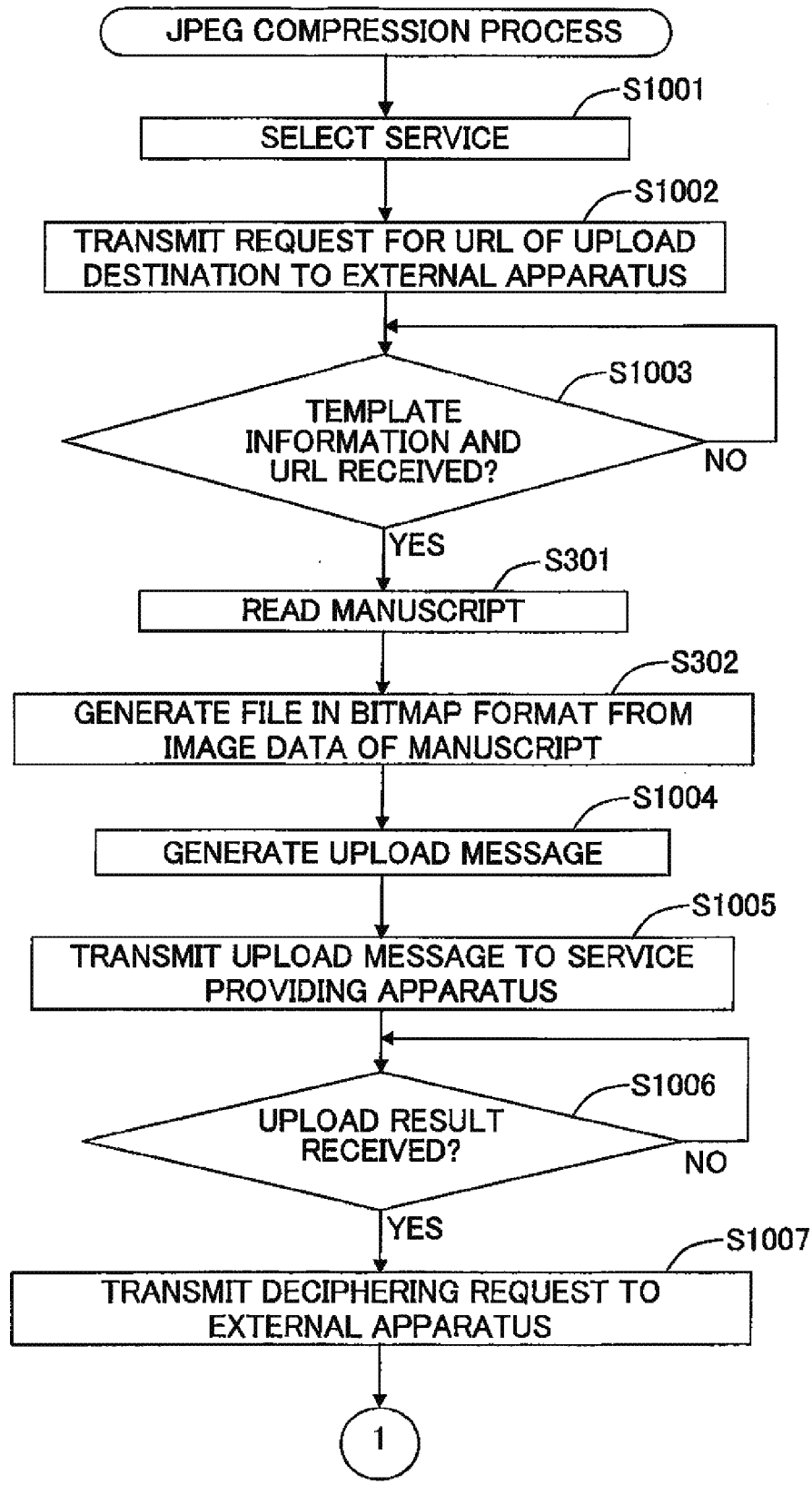

Next, a fifth embodiment will be explained with reference to FIGS. 11 and 12. In the first to third embodiments described above, the upload destination of the file is designated such that the user operates the operation unit (for example, the touch panel 17 or the input device 115) to input URL on the path input screen (not shown). In this embodiment, the upload destination of the file is designated by designating URL acquired from an external apparatus.

In the fifth embodiment, the same parts or components as those of the first embodiment are designated by the same reference numerals, any explanation of which will be omitted. As shown in FIG. 11, MFP 1 transmits/receives various types of data with respect to an external apparatus 300, a server 500A, and a server 500B via the internet I/F. The servers 500A, 500B are servers which are installed on the internet by respective service business operators in order to provide the electronic file storage service. The server 500A provides the electronic file storage service A, and the server 500B provides the electronic file storage service B. When it is unnecessary to specifically distinguish the both from each other, they are simply referred to as "server 500" to provide the electronic file storage service. The server 500 performs the communication with MFP 1 connected to the internet on the basis of HTTP or HTTPS. The server 500 accepts the upload of the electronic file including the image file and the document file from MFP 1, and the server 500 stores the file for which the upload is accepted. If the server 500 accepts the request for URL for designating the file to be stored, from MFP 1, the server 500 replies and transmits the file corresponding to URL.

In order to upload the electronic file to the server 500, it is necessary to utilize API (Application Program Interface) provided by the program of the server 500. MFP 1 of this embodiment is not provided with the program which is to be provided in order to utilize API provided by the server 500. However, the external apparatus 300, which can utilize API provided by the server 500, relays the transmission/receiving of the data between MFP 1 and the server 500. Therefore, MFP 1 can upload the image file to the server 500 by the aid of the external apparatus 300.

When the external apparatus 300 receives the request for URL of the upload destination including the designation of the electronic file storage service from MFP 1, the external apparatus 300 requests the server 500 for providing the designated electronic file storage service to send URL of the upload destination. When the external apparatus 300 receives URL of the upload destination from the server 500, the external apparatus 300 transmits received URL of the upload destination and the template information corresponding to the designated electronic file storage service to MFP 1 which is the source of request for URL of the upload destination. The template information is the data for designating the structure of the upload data in the form or format capable of being accepted by the server which provides the electronic file storage service. In particular, the template information is the data for designating, for example, the command, ID, the user information, and the addresses of the data to be included in the header portion and the body portion of the data. As described above, MFP 1 of this embodiment is not provided with the program for utilizing API provided by the server 500. However, the image file can be uploaded from MFP 1 to the server 500 by receiving the template information from the external apparatus 300.

Further, the external apparatus 300 performs the process in S1007 described later on such that the upload result transmitted by MFP 1 to the external apparatus 300 is deciphered or decoded, and the deciphering result is transmitted to MFP 1. The upload result is in the data format to which MFP 1 is not adapted. However, the external apparatus 300 deciphers or decodes the upload result to make the change into the data format to which MFP 1 is adapted, and the result is transmitted to MFP 1. Accordingly, MFP 1 can utilize the upload result.

Next, an explanation will be made with reference to FIG. 12 about the JPEG compression process executed by MFP 1 in the fifth embodiment. This process is executed if the scanner 20 is instructed to read the manuscript in such a state that the JPEG format is designated as the storage format by a user and it is designated that the image file in the bitmap format is uploaded to the server 500 for providing the electronic file storage service. The same steps as those of the JPEG compression process shown in FIG. 3 are designated by the same step numbers, any explanation of which will be omitted.

At first, in S1001, CPU 101 accepts the selection of the service. In this embodiment, any one of the electronic file storage service A and the electronic file storage service B is accepted. This process may be constructed, for example, as follows. That is, LCD 16 is allowed to display the electronic file storage services as candidates, and any one of the electronic file storage services is accepted by means of the touch panel 17. The process proceeds to S1002.

In S1002, the request for URL of the upload destination, which includes the information for designating the electronic file storage service accepted in S1001, is transmitted by CPU 10 to the external apparatus 300 via the internet I/F 25. The process proceeds to S1003. In S1003, CPU 10 judges whether or not URL of the upload destination and the template information are received from the external apparatus 300 via the internet OF 25. If it is judged that URL of the upload destination and the template information are received (S1003: Yes), the process proceeds to S301. If it is judged that URL of the upload destination and the template information are not received yet (S1003: No), the process returns to S1003 to repeat the judgment. The processes in S301 and S302 are the same as or equivalent to those of the first embodiment, any explanation of which is omitted.

In S1004, CPU 10 prepares an upload message. The upload message to be prepared includes URL of the upload destination received from the external apparatus 300 and the binary data of the bitmap file prepared in S302. MFP 1 can prepare the upload message adapted to each of the services by merely storing the binary data of the bitmap file, URL of the upload destination, and the other data designated by the template information at predetermined positions of the header and the body of the data frame in accordance with the template information received from the external apparatus 300. The process proceeds to S1005.

In S1005, CPU 10 transmits the upload message prepared in S1004 to the server 500 via the internet I/F 25. The process proceeds to S1006.

In S1006, CPU 10 judges whether or not the upload result is received by the aid of the internet I/F 25. The upload result includes the upload result of the electronic file included in the upload message and URL to indicate the area in which the electronic file is uploaded. If it is judged by CPU 10 that the upload result is received (S1006: Yes), the process proceeds to S1007. On the other hand, if it is judged that the upload result is not received yet (S1006: No), the process returns to S1006 to repeat the judgment.

In S1007, the deciphering request, which includes the upload result judged to be received in S1006, is transmitted by CPU 10 to the external apparatus 300 via the internet I/F 25. The process proceeds to S1008.

In S1008, CPU 10 judges whether or not the deciphering result is received via the Internet I/F 25 from the external apparatus 300. If it is judged that the deciphering result is received (S1008: Yes), the process proceeds to S1009. On the other hand, if it is judged that the deciphering result is not received yet (S1008: No), the process returns to S1008 to repeat the judgment. The upload result of the electronic file and URL to indicate the area in which the electronic file is uploaded, which are included in the upload result received by MFP 1 in S1006, are included in the deciphering result, in the data format to which MFP 1 is adapted. The process proceeds to S1009.

In S1009, URL included in the deciphering result is converted into the two-dimensional code data by CPU 10. The process proceeds to S306. The processes in S306 and the followings are the same as or equivalent to those of the first embodiment, any explanation of which is omitted.

According to the JPEG compression process of this embodiment as described above, the image data of the manuscript read by the scanner 20 is stored in the memory card 19 as the compressed image file in the JPEG format. On the other hand, the high quality image before the compression can be stored as the image file in the bitmap format in the server 500 provided by the electronic file storage service. In this procedure, the two-dimensional code data, which indicates the upload destination (storage position in the server 500) of the image file in the bitmap format, is stored in the thumbnail area 31 of the image file in the JPEG format stored in the memory card 19. When the memory card 19 is installed to any apparatus (for example, MFP 1a) other than MFP 1, then it is possible to easily acquire the storage position of the image file of the high quality image before the compression (image file in the bitmap format) on the basis of the two-dimensional code data stored in the thumbnail area 31 of the image file in the JPEG format, and it is possible to easily perform the download from the server 500, even in the case of the apparatus other than MFP 1.

In the embodiment described above, MFP 1 and PC 100 are examples of the information processing apparatus. The server 500 is an example of the file storage apparatus. The external apparatus 300 is an example of the external apparatus. The additional information data area 30 including the thumbnail area 31 is an example of the additional information area. The thumbnail area 31 is an example of the thumbnail area. The operation key 15, the touch panel 17, and the input device 115 are examples of the accepting unit. The control program 11a and the various programs 113a are examples of the information processing program.

CPU 10 or CPU 110, which executes S301, S701, S801, S901, is an example of the first acquiring controller. CPU 10 or CPU 110, which executes S306, S705, S805, S903, is an example of the generating controller. CPU 10 or CPU 110, which executes S303, S702, S802, S902, S1008, is an example of the second acquiring controller. CPU 10 or CPU 110, which executes S307, S706, S806, S904, is an example of the storing controller. CPU 10 or CPU 110, which executes S305, S704, S804, S902, is an example of the preparing controller. CPU 10 or CPU 110, which executes S304, S703, S803, S1005, is an example of the transmitting controller.

CPU 10 or CPU 110, which executes S303, S702, S802, is an example of the accepting unit.

The present invention has been explained above on the basis of the embodiments. However, the present invention is not limited to the embodiments described above at all. It is possible to easily presume that various improvements and modifications can be made within a range without deviating from the gist or essential characteristics of the present invention.

For example, in the respective embodiments described above, MFP 1 or PC 100 has been explained as an example of the information processing apparatus. However, various apparatuses or devices, which include, for example, printer, scanner, personal computer, mobile phone, smartphone, PDA, tablet terminal, and digital camera, may be also examples of the information processing apparatus. That is, when the second file, which is in the same file format as that of the first file or which is in the file format different from that of the first file, is generated from the first file stored in the apparatus or the memory card or from the image data for generating the first file (for example, reading data or photographed image data) in the apparatus as described above, the two-dimensional code data may be stored in the thumbnail area 31 of the generated second file.

In the first and fifth embodiments described above, MFP 1 has been exemplified as the information processing apparatus. However, PC 100 may be used as the information processing apparatus in the same manner as in the second to fourth embodiments described above. In this case, a manuscript may be read by using a scanner or a scanner function of MFP 1 connected via USB_I/F 124 of PC 100, and the obtained image data may be processed in accordance with the JPEG compression process described above (see FIG. 3). In the second to fourth embodiments described above, PC 100 has been exemplified as the information processing apparatus. However, MFP 1 may be used as the information processing apparatus in the same manner as in the first embodiment described above. In the second to fourth embodiments described above, the file, which is stored in HDD 13 (file memory 113*b*), is used as the file as the source of compression or the source of conversion. However, it is of course possible to use any file stored, for example, in an external media such as the memory card 19 or external HDD, as the file as the source of compression or the source of conversion.

The respective embodiments described above have been constructed such that the two-dimensional code data is stored in the thumbnail area 31 of the image file in the JPEG format or in the thumbnail area of the file in the PDF format. The present invention is applicable to any file format provided that the thumbnail area is possessed, without being limited to the JPEG format or the PDF format. For example, an image file in the TIFF format, which has a thumbnail area similar to the thumbnail area 31, can be also applied to the present invention.

In the respective embodiments described above, QR code (trade name) has been explained as an example of the two-dimensional code. However, it is also allowable to use any code of any other type.

The first, second, and fifth embodiments described above have been constructed such that the two-dimensional code data, which indicates the storage position of the file in the server 500, is stored in the thumbnail area 31 of the image file in the JPEG format. However, text data, which indicates the storage position of the file in the server 500, may be stored in the additional information data area 30 of the image file in the JPEG format. For example, it is also allowable to provide such an arrangement that URL, which is accepted by CPU 10 or CPU 110 in S303, S702, is stored in the additional information data area 30. Similarly, in relation to the third and fourth embodiments described above, it is also allowable to provide such an arrangement that URL accepted by CPU 110 in S802 or the path acquired in S902 may be stored in the additional information data area possessed by the file in the PDF format.

An explanation will now be made with reference to FIG. 10 about a specified modified embodiment provided to download an objective file from the server 500 by MFP 1*a* as another apparatus when MFP 1 or PC 100 stores the text data (URL, path) to indicate the storage position of the file in the additional information data area of the file (for example, the additional information data area 30) as described above. The same processes as those of the media print process shown in FIG. 4 described above are designated by the same step numbers, any explanation of which will be omitted.

Figure 10B:
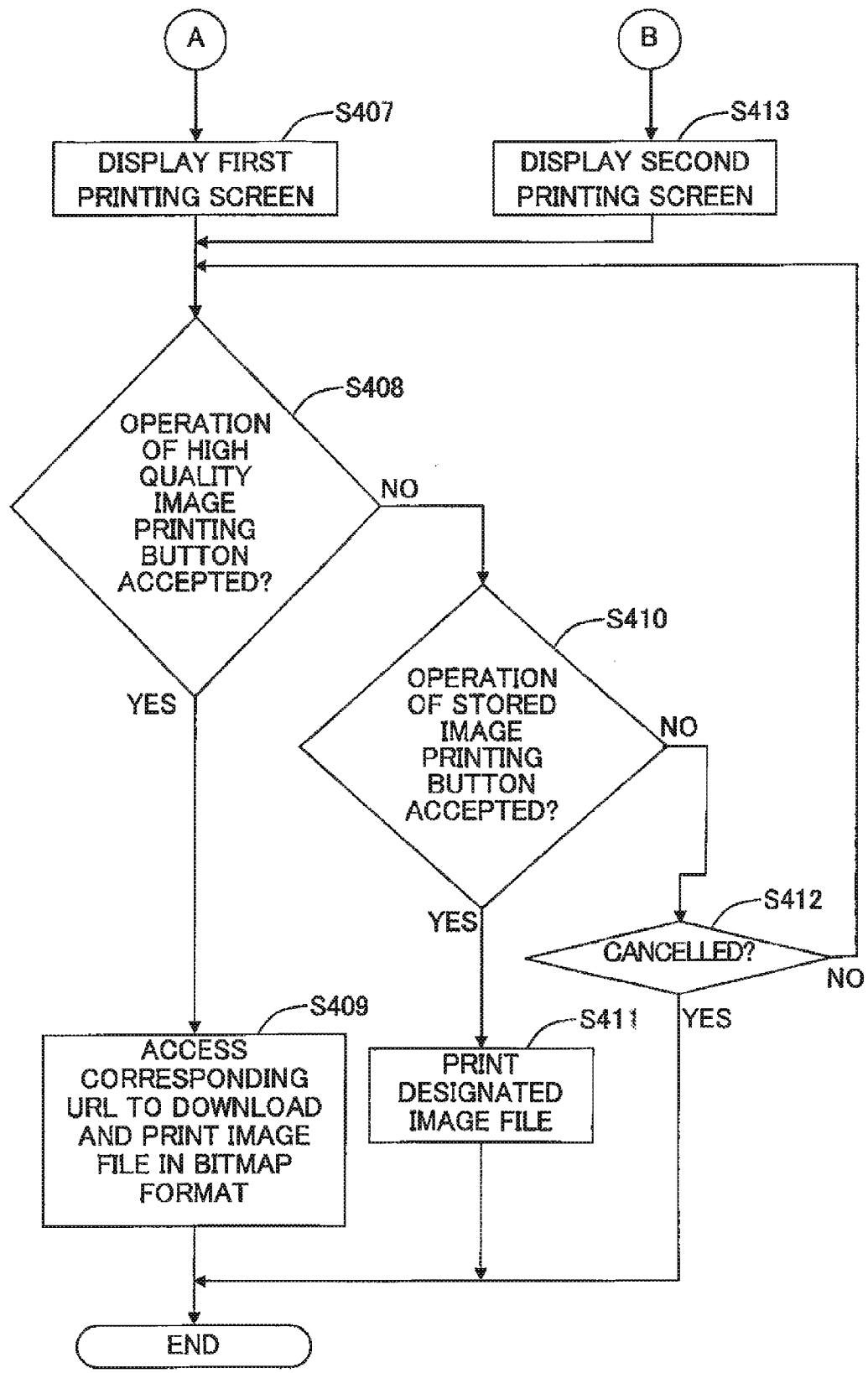

The media print process shown in FIG. 10 is executed if the memory card 19 is installed to the memory card I/F 18 of MFP 1*a* by a user and the execution of the media print function is instructed, in the same manner as the media print process shown in FIG. 4 described above. At first, CPU 10 executes the processes of S401 to S403 in the same manner as in the media print process shown in FIG. 4 described above. Subsequently, CPU 10 analyzes the additional information data area 30 of the designated image file (S1001) to judge whether or not URL is stored in the additional information data area 30 (S1002).

If URL is stored in the additional information data area 30 (S1002: Yes), and URL is URL which is previously registered in MFP 1*a* as the storage position of the image file in the bitmap format stored in the server 500 (S1003: Yes), then CPU 10 allows LCD 16 to display the first printing screen 50*a* (S407), and the process is allowed to proceed to S408. On the other hand, if URL is stored in the additional information data area 30 (S1002: Yes), but URL is not previously registered in MFP 1*a* (S1003: No), or URL is not stored in the additional information data area 30 (S1002: No), then CPU 10 allows LCD 16 to display the second printing screen 50*b* (S413), and the process is allowed to proceed to S408.

Subsequently, CPU 10 executes the processes of S408 to S412 in the same manner as in the media print process shown in FIG. 4 described above. That is, if CPU 10 accepts the operation of the high quality image printing button 51*b* on the first printing screen 50*b* (S408: Yes), CPU 10 accesses URL corresponding to the high quality image printing button 51*b* (i.e., URL stored in the additional information data area 30) by the aid of the internet I/F 25 to download the corresponding image file in the bitmap format. The image of the downloaded image file in the bitmap format is printed by the printer 21 (S409), and this process is completed. On the other hand, if CPU 10 accepts the operation of the stored image printing button 51*a* on the first printing screen 50*a* or the second printing screen 50*b* (S410: Yes), then CPU 10 allows the printer 21 to print the printing objective of the designated image file (S411), and this process is completed. If CPU 10 accepts the operation of the cancel button 52 on the first or second printing screen 50*a*, 50*b* (S412: Yes), CPU 10 completes this process. On the other hand, if the cancel button 52 is not operated on the first or second printing screen 50*a*, 50*b* (S412: No), CPU 10 returns the process to S408.

The media print processes shown in FIGS. 4 and 10 have been explained as exemplified by the image file in the JPEG format by way of example. However, the same or equivalent process can be applied to any file format provided that the additional information data area or the thumbnail area is provided.

The first to third embodiments described above have been constructed such that the upload destination of the file is designated by inputting URL into the path input screen (not shown) by operating the operation unit (for example, the touch panel 17 or the input device 115) by the user. However, there is no limitation thereto. For example, the following arrangement is also available. That is, the folder hierarchy of the apparatus of the upload destination (server 500) is displayed so that the folder hierarchy can be selected. The folder, in which the file is desired to be stored, is selected by a user by operating the operation unit, and thus the upload destination is designated. Alternatively, the following arrangement is also available. That is, the upload destination of the file is designated by designating URL acquired from an external apparatus. In this case, the external apparatus, which is the source of provision of URL, may be either the external apparatus which is the upload destination of the file or any other external apparatus which is not the upload destination of the file. Alternatively, the following arrangement is also available. That is, the upload destination of the file is designated by designating URL stored beforehand, for example, in the memory card 19 or HDD 113.

What is claimed is:

1. An information processing apparatus comprising:
   a first acquiring controller configured to acquire a first file;
   a second acquiring controller configured to acquire area information to identify a storage area, on a predetermined storage medium, in which the first file acquired by the first acquiring controller is stored;
   a generating controller configured to generate a second file having an additional information area in which additional information is stored, from the first file acquired by the first acquiring controller; and
   a storing controller configured to store the area information acquired by the second acquiring controller as the additional information in the additional information area of the second file generated by the generating controller.

2. The information processing apparatus according to claim 1, further comprising:
   a preparing controller configured to prepare code data to indicate the area information acquired by the second acquiring controller;
   wherein the storing controller stores the code data prepared by the preparing controller, as the additional information, in the additional information area of the second file generated by the generating controller.

3. The information processing apparatus according to claim 2;
   wherein the additional information area includes a thumbnail area in which data corresponding to a reduction image of an image of the second file is stored; and
   wherein the storing controller stores the code data prepared by the preparing controller in the thumbnail area of the second file generated by the generating controller.

4. The information processing apparatus according to claim 1;
   wherein the information processing apparatus is configured to communicate with a file storage apparatus;
   wherein the predetermined storage medium is provided in the file storage apparatus; and
   wherein the information processing apparatus further comprises a transmitting controller configured to transmit the first file acquired by the first acquiring controller to the storage area of the file storage apparatus indicated by the area information acquired by the second acquiring controller.

5. The information processing apparatus according to claim 4, further comprising:
   an accepting unit configured to accept input operation for inputting the area information concerning the file storage apparatus;
   wherein the second acquiring controller acquires the area information accepted by the accepting unit.

6. The information processing apparatus according to claim 1;
   wherein the predetermined storage medium is provided in the information processing apparatus; and
   wherein the area information indicates the storage area, in which the first file is stored, on the predetermined storage medium provided in the information processing apparatus.

7. The information processing apparatus according to claim 4;
   wherein the information processing apparatus is configured to communicate with the file storage apparatus via an external apparatus;
   wherein the information processing apparatus further comprises an area information receiving controller configured to receive the area information from the external apparatus; and
   wherein the second acquiring controller acquires the area information received by the area information receiving controller.

8. The information processing apparatus according to claim 1;
   wherein the generating controller generates the second file in a file format different from that of the first file, from the first file acquired by the first acquiring controller.

9. The information processing apparatus according to claim 1;
   wherein the generating controller generates the second file from the first file acquired by the first acquiring controller, the second file being in the same file format as that of the first file and the second file having a data amount smaller than that of the first file.

10. The information processing apparatus according to claim 1;
    wherein a file format of the second file is any one of JPEG format, PDF format, and TIFF format.

11. The information processing apparatus according to claim 1;
    wherein the first acquiring controller acquires image data for generating the first file;
    wherein the generating controller generates the second file from the image data; and
    wherein the second acquiring controller acquires the area information to indicate the storage area of the first file generated from the image data.

12. A non-transitory computer readable storage medium in which an information processing program is stored, the program making an information processing apparatus execute steps comprising:
    a first acquiring step in which a first file is acquired;
    a generating step in which a second file is generated from the first file acquired in the first acquiring step, the second file having an additional information area in which additional information is stored;
    a second acquiring step in which area information to identify a storage area for storing the first file acquired in the first acquiring step is acquired; and a storing step in which data to indicate the area information acquired in the second acquiring step is stored, as the additional information, in the additional information area of the second file generated in the generating step.

13. An information processing method comprising:

a first acquiring step in which a first file is acquired;

a generating step in which a second file is generated from the first file acquired in the first acquiring step, the second file having an additional information area in which additional information is stored;

a second acquiring step in which area information to identify a storage area for storing the first file acquired in the first acquiring step is acquired; and a storing step in which the area information acquired in the second acquiring step is stored, as the additional information, in the additional information area of the second file generated in the generating step.

14. The medium according to claim 12, further comprising:

a preparing step in which code data to indicate the area information acquired in the second step is prepared;

wherein in the storing step, the code data prepared in the preparing step, as the additional information, is stored in the additional information area of the second file generated in the generating step.

15. The medium according to claim 14;

wherein the additional information area includes a thumbnail area in which data corresponding to a reduction image of an image of the second file is stored; and wherein in the storing step, the code data prepared in the preparing step is stored in the thumbnail area of the second file generated in the generating step.

16. The medium according to claim 12;

wherein the information processing apparatus is configured to communicate with a file storage apparatus;

wherein the storage area for storing the first file is provided in the file storage apparatus; and wherein the program makes the information processing apparatus further execute a transmitting step in which the first file acquired in the first acquiring step is transmitted to the storage area of the file storage apparatus indicated by the area information acquired in the second acquiring step.

17. The medium according to claim 12;

wherein in the generating step, the second file in a file format different from that of the first file is generated from the first file acquired in the first acquiring step.

18. The medium according to claim 12;

wherein the second file is in the same file format as that of the first file and the second file has a data amount smaller than that of the first file.

19. The medium according to claim 12;

wherein a file format of the second file is any one of JPEG format, PDF format, and TIFF format.

20. The medium according to claim 12;

wherein in the first acquiring step, image data for generating the first file is acquired;

wherein in the generating step, the second file is generated from the image data; and wherein in the second acquiring step, the area information to indicate the storage area of the first file generated from the image data is acquired.

* * * * *